(12) United States Patent
Pettey

(10) Patent No.: US 8,032,659 B2
(45) Date of Patent: Oct. 4, 2011

(54) METHOD AND APPARATUS FOR A SHARED I/O NETWORK INTERFACE CONTROLLER

(75) Inventor: Christopher J. Pettey, Cedar Park, TX (US)

(73) Assignee: NextIO Inc., Austin, TX (US)

(*) Notice: Subject to any disclaimer, the term of this patent is extended or adjusted under 35 U.S.C. 154(b) by 1385 days.

(21) Appl. No.: 11/050,420

(22) Filed: Feb. 3, 2005

(65) Prior Publication Data

US 2005/0268137 A1 Dec. 1, 2005

Related U.S. Application Data

(63) Continuation-in-part of application No. 10/827,622, filed on Apr. 19, 2004, now Pat. No. 7,219,183, and a continuation-in-part of application No. 10/827,620, filed on Apr. 19, 2004, and a continuation-in-part of application No. 10/827,117, filed on Apr. 19, 2004, now Pat. No. 7,188,209, and a continuation-in-part of application No. 10/909,254, filed on Jul. 30, 2004, and a continuation-in-part of application No. 10/864,766, filed on Jun. 9, 2004, and a continuation-in-part of application No. 10/802,532, filed on Mar. 16, 2004, and a continuation-in-part of application No. 10/757,714, filed on Jan. 14, 2004, now Pat. No. 7,046,668, and a continuation-in-part of application No. 10/757,713, filed on Jan. 14, 2004, now Pat. No. 7,457,906, and a continuation-in-part of application No. 10/757,711, filed on Jan. 14, 2004, now Pat. No. 7,103,064.

(60) Provisional application No. 60/541,673, filed on Feb. 4, 2004, provisional application No. 60/555,127, filed on Mar. 22, 2004, provisional application No. 60/575,005, filed on May 27, 2004, provisional application No. 60/588,941, filed on Jul. 19, 2004, provisional application No. 60/589,174, filed on Jul. 19, 2004, provisional application No. 60/615,775, filed on Oct. 4, 2004, provisional application No. 60/440,788, filed on Jan. 15, 2003, provisional application No. 60/440,789, filed on Jan. 21, 2003, provisional application No. 60/464,382, filed on Apr. 18, 2003, provisional application No. 60/491,314, filed on Jul. 30, 2003, provisional application No. 60/515,558, filed on Oct. 29, 2003, provisional application No. 60/523,522, filed on Nov. 19, 2003.

(51) Int. Cl.
*G06F 13/00* (2006.01)
(52) U.S. Cl. ........................................ 709/250
(58) Field of Classification Search .................. 370/463; 710/316–317; 709/250
See application file for complete search history.

(56) References Cited

U.S. PATENT DOCUMENTS 4,058,672 A 11/1977 Crager et al.
(Continued)

FOREIGN PATENT DOCUMENTS

EP 0574691 A 12/1993
(Continued)

OTHER PUBLICATIONS

PCI Express Base Specification Revision 1.0 Apr. 29, 2002.*
(Continued)

*Primary Examiner* — Robert B Harrell
(74) *Attorney, Agent, or Firm* — James W. Huffman

(57) ABSTRACT

A network interface controller is provided which is shareable by a plurality of operating system domains (OSDs) within their load-store architecture. The controller includes local resources for corresponding to the OSDs, and global resources corresponding to both the OSDs and a network fabric. A method and apparatus is provided for distinguishing between the local and global resources, for purposes of reset and configuration. The controller allows a reset of only those local resources which are associated with the OSD transmitting the reset. Registration logic allows one of the OSDs to register as master, for configuration and reset of global resources.

51 Claims, 19 Drawing Sheets

U.S. PATENT DOCUMENTS

| | | | |
|---|---|---|---|
| 5,280,614 A | 1/1994 | Munroe et al. | |
| 5,414,851 A | 5/1995 | Brice, Jr. et al. | |
| 5,581,709 A | 12/1996 | Ito et al. | |
| 5,590,285 A | 12/1996 | Krause et al. | |
| 5,590,301 A | 12/1996 | Guenthner et al. | |
| 5,600,805 A | 2/1997 | Fredericks et al. | |
| 5,623,666 A | 4/1997 | Pike et al. | |
| 5,633,865 A | 5/1997 | Short | |
| 5,758,125 A | 5/1998 | Misinai et al. | |
| 5,761,669 A | 6/1998 | Montague et al. | |
| 5,790,807 A | 8/1998 | Fishler et al. | |
| 5,812,843 A | 9/1998 | Yamazaki et al. | |
| 5,909,564 A | 6/1999 | Alexander et al. | |
| 5,923,654 A | 7/1999 | Schnell | |
| 5,926,833 A | 7/1999 | Rasoulian et al. | |
| 6,009,275 A | 12/1999 | DeKoning et al. | |
| 6,014,669 A | 1/2000 | Slaughter et al. | |
| 6,044,465 A | 3/2000 | Dutcher et al. | |
| 6,047,339 A | 4/2000 | Su et al. | |
| 6,055,596 A | 4/2000 | Cepulis | |
| 6,078,964 A | 6/2000 | Ratcliff et al. | |
| 6,112,263 A | 8/2000 | Futral | |
| 6,128,666 A | 10/2000 | Muller et al. | |
| 6,141,707 A | 10/2000 | Halligan et al. | |
| 6,167,052 A | 12/2000 | McNeill et al. | |
| 6,170,025 B1 | 1/2001 | Drottar et al. | |
| 6,222,846 B1 | 4/2001 | Bonola et al. | |
| 6,240,467 B1 | 5/2001 | Beardsley et al. | |
| 6,247,077 B1 | 6/2001 | Muller et al. | |
| 6,343,324 B1 | 1/2002 | Hubis et al. | |
| 6,421,711 B1 | 7/2002 | Blumenau et al. | |
| 6,484,245 B1 | 11/2002 | Sanada et al. | |
| 6,496,880 B1 | 12/2002 | Ma et al. | |
| 6,507,896 B2 | 1/2003 | Sanada et al. | |
| 6,510,496 B1 | 1/2003 | Tarui et al. | |
| 6,523,096 B2 | 2/2003 | Sanada et al. | |
| 6,535,964 B2 | 3/2003 | Sanada et al. | |
| 6,542,919 B1 | 4/2003 | Wendorf et al. | |
| 6,556,580 B1 | 4/2003 | Wang et al. | |
| 6,571,360 B1 | 5/2003 | Drogichen et al. | |
| 6,601,116 B1 | 7/2003 | Shemla et al. | |
| 6,615,336 B1 | 9/2003 | Chen et al. | |
| 6,622,153 B1 | 9/2003 | Lee et al. | |
| 6,633,916 B2 | 10/2003 | Kauffman | |
| 6,640,206 B1 | 10/2003 | Callender et al. | |
| 6,662,254 B1 | 12/2003 | Tal et al. | |
| 6,665,304 B2 | 12/2003 | Beck et al. | |
| 6,678,269 B1 | 1/2004 | Michels et al. | |
| 6,721,806 B2 | 4/2004 | Boyd et al. | |
| 6,728,844 B2 | 4/2004 | Sanada et al. | |
| 6,742,090 B2 | 5/2004 | Sanada et al. | |
| 6,745,281 B1 | 6/2004 | Saegusa | |
| 6,754,755 B1* | 6/2004 | Johnson et al. | 710/262 |
| 6,760,793 B2 | 7/2004 | Kelley et al. | |
| 6,772,270 B1 | 8/2004 | Kurpanek | |
| 6,779,071 B1 | 8/2004 | Kallat et al. | |
| 6,820,168 B2 | 11/2004 | Tanaka et al. | |
| 6,823,458 B1 | 11/2004 | Lee et al. | |
| 6,834,326 B1 | 12/2004 | Wang et al. | |
| 6,859,825 B1 | 2/2005 | Williams | |
| 6,877,073 B2 | 4/2005 | Sanada et al. | |
| 6,918,060 B2 | 7/2005 | Fanning | |
| 6,944,617 B2 | 9/2005 | Harriman | |
| 6,961,761 B2 | 11/2005 | Masuyama et al. | |
| 7,013,353 B2 | 3/2006 | Parthasarathy et al. | |
| 7,024,510 B2 | 4/2006 | Olarig | |
| 7,046,668 B2 | 5/2006 | Pettey et al. | |
| 7,082,524 B2* | 7/2006 | Shah | 713/1 |
| 7,103,064 B2 | 9/2006 | Pettey et al. | |
| 7,136,953 B1 | 11/2006 | Bisson et al. | |
| 7,152,128 B2 | 12/2006 | Wehage et al. | |
| 7,180,887 B1 | 2/2007 | Schwaderer et al. | |
| 7,194,517 B2 | 3/2007 | Conway et al. | |
| 7,213,065 B2 | 5/2007 | Watt | |
| 7,231,486 B2 | 6/2007 | Ajanovic et al. | |
| 7,418,522 B2 | 8/2008 | Berg | |
| 7,421,578 B1* | 9/2008 | Huang et al. | 713/163 |
| 7,457,906 B2 | 11/2008 | Pettey et al. | |
| 7,493,416 B2 | 2/2009 | Pettey | |
| 7,620,066 B2 | 11/2009 | Pettey et al. | |
| 2001/0032280 A1 | 10/2001 | Osakada et al. | |
| 2002/0016845 A1* | 2/2002 | Palmer et al. | 709/229 |
| 2002/0026558 A1 | 2/2002 | Reuter et al. | |
| 2002/0027906 A1 | 3/2002 | Athreya et al. | |
| 2002/0029319 A1 | 3/2002 | Robbins et al. | |
| 2002/0052914 A1 | 5/2002 | Zalewski et al. | |
| 2002/0072892 A1 | 6/2002 | Shirley | |
| 2002/0073257 A1 | 6/2002 | Beukema et al. | |
| 2002/0078271 A1 | 6/2002 | Berry | |
| 2002/0099901 A1 | 7/2002 | Tanaka et al. | |
| 2002/0107903 A1 | 8/2002 | Richter et al. | |
| 2002/0124114 A1 | 9/2002 | Bottom et al. | |
| 2002/0126693 A1 | 9/2002 | Stark et al. | |
| 2002/0172195 A1 | 11/2002 | Pekkala et al. | |
| 2002/0186694 A1 | 12/2002 | Mahajan et al. | |
| 2003/0069975 A1 | 4/2003 | Abjanic et al. | |
| 2003/0069993 A1 | 4/2003 | Na et al. | |
| 2003/0079055 A1 | 4/2003 | Chen | |
| 2003/0091037 A1 | 5/2003 | Latif et al. | |
| 2003/0112805 A1 | 6/2003 | Stanton | |
| 2003/0123484 A1 | 7/2003 | Harriman | |
| 2003/0126202 A1 | 7/2003 | Watt | |
| 2003/0131105 A1 | 7/2003 | Czieger et al. | |
| 2003/0158992 A1 | 8/2003 | Ajanovic et al. | |
| 2003/0163341 A1 | 8/2003 | Banerjee et al. | |
| 2003/0188060 A1 | 10/2003 | Van Hensbergen | |
| 2003/0200315 A1 | 10/2003 | Goldenberg et al. | |
| 2003/0200330 A1 | 10/2003 | Oelke et al. | |
| 2003/0204593 A1 | 10/2003 | Brown et al. | |
| 2003/0208531 A1 | 11/2003 | Matters et al. | |
| 2003/0208551 A1 | 11/2003 | Matters et al. | |
| 2003/0208631 A1 | 11/2003 | Matters et al. | |
| 2003/0208632 A1 | 11/2003 | Rimmer | |
| 2003/0208633 A1 | 11/2003 | Rimmer | |
| 2003/0212830 A1 | 11/2003 | Greenblat et al. | |
| 2003/0217183 A1 | 11/2003 | Rimmer et al. | |
| 2003/0235204 A1* | 12/2003 | Azevedo et al. | 370/466 |
| 2004/0003140 A1 | 1/2004 | Rimmer | |
| 2004/0013092 A1 | 1/2004 | Betker et al. | |
| 2004/0013124 A1 | 1/2004 | Peebles et al. | |
| 2004/0019714 A1 | 1/2004 | Kelley et al. | |
| 2004/0019726 A1 | 1/2004 | Kelley et al. | |
| 2004/0019729 A1 | 1/2004 | Kelley et al. | |
| 2004/0024894 A1 | 2/2004 | Osman et al. | |
| 2004/0024944 A1 | 2/2004 | Riley | |
| 2004/0025166 A1 | 2/2004 | Adlung et al. | |
| 2004/0039892 A1 | 2/2004 | Goldschmidt | |
| 2004/0054838 A1 | 3/2004 | Hoese et al. | |
| 2004/0068591 A1 | 4/2004 | Workman et al. | |
| 2004/0073712 A1 | 4/2004 | Larson et al. | |
| 2004/0073716 A1 | 4/2004 | Boom et al. | |
| 2004/0081104 A1 | 4/2004 | Pan et al. | |
| 2004/0088414 A1 | 5/2004 | Flynn et al. | |
| 2004/0098532 A1 | 5/2004 | Huang et al. | |
| 2004/0109460 A1 | 6/2004 | Banks et al. | |
| 2004/0109473 A1 | 6/2004 | Lebizay et al. | |
| 2004/0111559 A1 | 6/2004 | Heil | |
| 2004/0116141 A1* | 6/2004 | Loven et al. | 455/519 |
| 2004/0117516 A1 | 6/2004 | Date | |
| 2004/0117536 A1 | 6/2004 | Franke et al. | |
| 2004/0117598 A1 | 6/2004 | Arimilli et al. | |
| 2004/0123014 A1 | 6/2004 | Schaefer et al. | |
| 2004/0128410 A1 | 7/2004 | Mayhew et al. | |
| 2004/0165588 A1 | 8/2004 | Pandya | |
| 2004/0186942 A1* | 9/2004 | Olarig | 710/313 |
| 2004/0193737 A1* | 9/2004 | Huffman et al. | 710/1 |
| 2004/0213211 A1 | 10/2004 | Green | |
| 2004/0221047 A1 | 11/2004 | Grover et al. | |
| 2004/0228280 A1* | 11/2004 | Moore et al. | 370/252 |
| 2004/0233921 A1 | 11/2004 | Krieg et al. | |
| 2004/0249975 A1 | 12/2004 | Tuck et al. | |
| 2005/0050240 A1 | 3/2005 | Wilkins et al. | |
| 2005/0080982 A1 | 4/2005 | Vasilevsky et al. | |
| 2005/0097271 A1 | 5/2005 | Davies et al. | |
| 2005/0114623 A1 | 5/2005 | Craddock et al. | |
| 2005/0169258 A1 | 8/2005 | Millet et al. | |
| 2005/0238035 A1 | 10/2005 | Riley | |

| | | | |
|---|---|---|---|
| 2006/0092928 | A1 | 5/2006 | Pike et al. |
| 2006/0184711 | A1 | 8/2006 | Pettey et al. |
| 2006/0206655 | A1 | 9/2006 | Chappell et al. |
| 2007/0050520 | A1 | 3/2007 | Riley |
| 2008/0117909 | A1 | 5/2008 | Johnson |

FOREIGN PATENT DOCUMENTS

| | | |
|---|---|---|
| EP | 0935200 A1 | 11/1999 |
| EP | 1115084 A2 | 7/2001 |
| EP | 1376932 A2 | 1/2004 |
| JP | 2002084311 A | 3/2002 |
| JP | 2002183102 A | 6/2002 |
| TW | 545015 | 8/2003 |
| WO | WO9419749 A1 | 1/1994 |
| WO | WO9929071 A1 | 6/1999 |
| WO | WO03085535 A2 | 10/2003 |

OTHER PUBLICATIONS

Ajay V Bhatt. "Creating a Third Generation I/O Interconnect" Jun. 4, 2003 Intel, XP002354597 http://www.intel.com/technology/pciexpress/downloads/3rdGenWhitePaper.pdf retrieved on Nov. 15, 2005.

"PCI Express Base Specification," Revision 1.0. PCI-SIG, Apr. 29, 2002, pp. 17-18.

Mehta, Pranav. "Advanced Switching boosts PCI Express," EE Times, ComrnsDesign, Online Oct. 28, 2002. Retrieved from Internet Nov. 30, 2005, <http://www.comrnsdesign.com/design_corner/showArticle.jhtml?articleID=16505864>.

PCI Express Base Specificattion. Rev. 1.0. Apr. 29, 2002.

Cohen et al. "PCI Express Architecture Power Management." Rev 1.1. Nov. 8, 2002.

"Network Interface Controller." FOLDOC—Free On-Line Dictionary of Computing. Http://foldoc.org/index.cgi?query=network+interface+controller. Apr. 11, 2008.

Koellner, Gregory. "NPIV Functionality Profile." Presentation, Jun. 5, 2002. Presentation # T11/02-340v0. Text # T11/02-338v0. www.t11.org.

Mellanox Technologies, Inc. "Understanding PCI Bus, PCI-Express and Infiniband Architecture (White Paper)." Document No. 2006WP. Mellanox Technologies, Inc. Santa Clara, CA, US.

Dugan et al. "N Port ID Virtualization." Nov. 29, 2001. Document No. 01-627v0. IBM Corporation. http://www.t11.org.

Dugan et al. "N_Port Virtualization: Proposed FC-FS Modifications." Jan. 19, 2002. Document No. 02-008v0. IBM Corporation. http://www.t11.org.

American National Standards Institute. "Fibre Channel—Framing and Signaling (FC-FS)." ANSI/INCITS Standard 373-2003. Oct. 22, 2003. pp. 307 and 311. American National Standards Institute, Inc. New York, NY, USA.

Forouzan, Behrouz A. "Data Communications and Networking, Third Edition." pp. 528-536. McGraw-Hill, 2004, 2001, 1998.

Seifert, Rich. "The Switch Book, The Complete Guide to LAN Switching Technology." pp. 431-473. John Wiley & Sons. 2000.

"Catalyst 3550 Multilayer Switch Software Configuration Guide." Chapter 13, pp. 1-14. Cisco Systems. Apr. 2002.

"802.1Q, IEEE Standards for Local and Metropolitan Area Networks, Virtual Bridged Local Area Networks." IEEE. May 7, 2003.

Holland et al. "Dynamic Switching between One-to-Many Download Methods I "ALL-IP" Cellular Networks" (abstract only) Publication date: May-Jun. 2006.

INCITS working draft proporsed American National Standard for Information Technology, Fibre Channel Framing and Signaling-2 (FC-FS-2). Jan. 16, 2004. Rev. 0.05. pp. i, 65, 67, 76, 80. http://www.t11.org/index.html.

PCI-SIG, PCI Local Bus Specification. Dec. 18, 1998. Revision 2.2, pp. 214-220. http://www.pcisig.com/home.

PCI-SIG, PCI Express Base Specification. Apr. 15, 2003. Revision 1.0a. pp. 27, 259-260. http://www.pcisig.com/home.

Kleiman et al. "SunOS on SPARC." (abstract only) Publication Date: Feb. 29-Mar. 3, 1988.

Marek Piekarski. "Advanced Switching Interconnect and Blade Server Re-Purposing in the Data Center." Aug. 21, 2004. XP002341367. URL: http://www.asi-sig.org/education/white papers/ASWhitePaper_Final_Copy.pdf.

PCI-SIG, PCI Local Bus Specification. Dec. 18, 1998. Revision 2.2, pp. 189-220. http://www.pcisig.com/home.

Solomon et al.: "Advanced Switching Architecture", XP002328190. Intel Developer Forum. Sep. 17, 2003. pp. 32-54. Retrieved from the Internet: URL:http://www.asi-sig.org/education/AS_Architecture_and_PI-8_Overview_-_Spring_IDF_2004_FINAL.pdf.

"Xilinx, Designing Network Attached Storage Platform With Advanced Switching" (XP002328191). Sep. 16, 2003. Retrieved from the Internet: URL://http://www.asi-sig.org/education/usage/xilinx_storage_usage.pdf.

Karin S. Puranik: "Advanced Switching Extends PCI Express" XCELL Journal, (XP002328192). Retrieved from the Internet: URL:www.xilinx.com/publications/xcellonline/xcell_47/xc_pdf/xc_pcix47.pdf, Feb. 2003.

Anonymous: "Fabrics and Application Characteristics for AdvancedTCA* Architectures" Intel Technology Journal, vol. 07, No. 04, Nov. 14, 2003 (XP002328193), ISSN: 1535-864X. Retrieved from the Internet: URL:www.intel.com/technology/itj/2003/volume07issue04/art02_fabrics/vol7iss4art02.pdf.

David Mayhew et al. "PCI Express and Advanced Switching: Evolutionary Path to Building Next Generation Interconnects" High Performance Interconnects, 2003. Proceedings. 11th Symposium on Aug. 20-22, 2003, Piscataway, NJ, USA. IEEE, Aug. 20, 2003, pp. 21-29, (XP010657970). ISBN: 0-7695-2012-X.

* cited by examiner

EMBODIMENTS OF DESCRIPTOR LOGIC

BLOCK DIAGRAM OF PRIOR ART NETWORK INTERFACE CONTROLLER

METHOD AND APPARATUS FOR A SHARED I/O NETWORK INTERFACE CONTROLLER

CROSS REFERENCE TO RELATED APPLICATION(S)

This application claims the benefit of the following U.S. Provisional Applications which are hereby incorporated by reference for all purposes:

| Ser. No. | Filing Date | Title |
| --- | --- | --- |
| 60/541,673 (NEXTIO.0107) | Feb. 4, 2004 | PCI SHARED I/O WIRE LINE PROTOCOL |
| 60/555,127 (NEXTIO.0108) | Mar. 22, 2004 | PCI EXPRESS SHARED IO WIRELINE PROTOCOL SPECIFICATION |
| 60/575,005 (NEXTIO.0109) | May 27, 2004 | NEXSIS SWITCH |
| 60/588,941 (NEXTIO.0110) | Jul. 19, 2004 | SHARED I/O DEVICE |
| 60/589,174 (NEXTIO.0111) | Jul. 19, 2004 | ARCHITECTURE |
| 60/615,775 (NEXTIO.0112) | Oct. 04, 2004 | PCI EXPRESS SHARED IO WIRELINE PROTOCOL SPECIFICATION |

This application is a Continuation-in-Part (CIP) of the below referenced pending U.S. Non-Provisional Patent Applications:

| Ser. No. | Filing Date | Title |
| --- | --- | --- |
| 10/757,714 (NEXTIO.0300) | Jan. 14, 2004 | METHOD AND APPARATUS FOR SHARED I/O IN A LOAD/STORE FABRIC |
| 10/757,713 (NEXTIO.0301) | Jan. 14, 2004 | METHOD AND APPARATUS FOR SHARED I/O IN A LOAD/STORE FABRIC |
| 10/757,711 (NEXTIO.0302) | Jan. 14, 2004 | METHOD AND APPARATUS FOR SHARED I/O IN A LOAD/STORE FABRIC |
| 10/802,532 (NEXTIO.0200) | Mar. 16, 2004 | SHARED INPUT/OUTPUT LOAD-STORE ARCHITECTURE |
| 10/864,766 (NEXTIO.0310) | Jun. 9, 2004 | METHOD AND APPARATUS FOR A SHARED I/O SERIAL ATA CONTROLLER |
| 10/909,254 (NEXTIO.0312) | Jul. 30, 2003 | METHOD AND APPARATUS FOR A SHARED I/O NETWORK INTERFACE CONTROLLER |
| 10/827,622 (NEXTIO.0400) | Apr. 19, 2004 | SWITCHING APPARATUS AND METHOD FOR PROVIDING SHARED I/O WITHIN A LOAD-STORE FABRIC |
| 10/827,620 (NEXTIO.0401) | Apr. 19, 2004 | SWITCHING APPARATUS AND METHOD FOR PROVIDING SHARED I/O WITHIN A LOAD-STORE FABRIC |
| 10/827,117 (NEXTIO.0402) | Apr. 19, 2004 | SWITCHING APPARATUS AND METHOD FOR PROVIDING SHARED I/O WITHIN A LOAD-STORE FABRIC | each of which are assigned to a common assignee (NextIO Inc.), and each of which are hereby incorporated by reference herein for all purposes.

All of the above referenced applications claim priority from the above referenced provisional applications which have a provisional filing date earlier than their non-provisional filing date. In addition, all of the above applications claim priority from the below referenced provisional applications which were not expired prior to their non-provisional filing date:

| Ser. No. | Filing Date | Title |
| --- | --- | --- |
| 60/440,788 (NEXTIO.0101) | Jan. 15, 2003 | SHARED IO ARCHITECTURE |
| 60/440,789 (NEXTIO.0102) | Jan. 21, 2003 | 3GIO-XAUI COMBINED SWITCH |
| 60/464,382 (NEXTIO.0103) | Apr. 18, 2003 | SHARED-IO PCI COMPLIANT SWITCH |
| 60/491,314 (NEXTIO.0104) | Jul. 30, 2003 | SHARED NIC BLOCK DIAGRAM |
| 60/515,558 (NEXTIO.0105) | Oct. 29, 2003 | NEXSIS |
| 60/523,522 (NEXTIO.0106) | Nov. 19, 2003 | SWITCH FOR SHARED I/O FABRIC | each of which are hereby incorporated by reference herein for all purposes.

FIELD OF THE INVENTION

This invention relates in general to the field of computer network architecture, and more specifically to an architecture to allow sharing and/or partitioning of network input/output (I/O) endpoint devices in a load/store fabric, particularly a shared network interface controller.

BACKGROUND OF THE INVENTION

Although the eight above referenced pending patent applications have been incorporated by reference, to assist the reader in appreciating the problem to which the present invention is directed, the Background of those applications is substantially repeated below.

Modern computer architecture may be viewed as having three distinct subsystems which when combined, form what most think of when they hear the term computer. These subsystems are: 1) a processing complex; 2) an interface between the processing complex and I/O controllers or devices; and 3) the I/O (i.e., input/output) controllers or devices themselves.

A processing complex may be as simple as a single microprocessor, such as a Pentium microprocessor, coupled to memory. Or, it might be as complex as two or more processors which share memory.

The interface between the processing complex and I/O is commonly known as the chipset. On the north side of the chipset (i.e., between the processing complex and the chipset) is a bus referred to as the HOST bus. The HOST bus is usually a proprietary bus designed to interface to memory, to one or more microprocessors within the processing complex, and to the chipset. On the south side of the chipset are a number of buses which connect the chipset to I/O devices. Examples of such buses include: ISA, EISA, PCI, PCI-X, and AGP.

I/O devices are devices that allow data to be transferred to or from the processing complex through the chipset, on one or more of the buses supported by the chipset. Examples of I/O devices include: graphics cards coupled to a computer display; disk controllers, such as Serial ATA (SATA) or Fiber Channel controllers (which are coupled to hard disk drives or other data storage systems); network controllers (to interface to networks such as Ethernet); USB and Firewire controllers which interface to a variety of devices from digital cameras to external data storage to digital music systems, etc.; and PS/2 controllers for interfacing to keyboards/mice. The I/O devices are designed to connect to the chipset via one of its supported interface buses. For example, modern computers typically couple graphic cards to the chipset via an AGP bus. Ethernet cards, SATA, Fiber Channel, and SCSI (data storage) cards, USB and Firewire controllers all connect to a PCI bus, and PS/2 devices connect to an ISA bus.

One skilled in the art will appreciate that the above description is general. However, what should be appreciated is that regardless of the type of computer, it will include a processing complex for executing instructions, an interface to I/O, and I/O devices to allow the processing complex to communicate with the world outside of itself. This is true whether the computer is an inexpensive desktop in a home, a high-end workstation used for graphics and video editing, or a clustered server which provides database support to hundreds within a large organization.

Also, although not yet referenced, a processing complex typically executes one or more operating systems (e.g., Microsoft Windows, Windows Server, Unix, Linux, Macintosh, etc.). This application therefore refers to the combination of a processing complex with one or more operating systems as an operating system domain (OSD). An OS domain, within the present context, is a system load-store memory map that is associated with one or more processing complexes. Typically, present day operating systems such as Windows, Unix, Linux, VxWorks, Macintosh, etc., must comport with a specific load-store memory map that corresponds to the processing complex upon which they execute. For example, a typical x86 load-store memory map provides for both memory space and I/O space. Conventional memory is mapped to the lower 640 kilobytes (KB) of memory. The next higher 128 KB of memory are employed by legacy video devices. Above that is another 128 KB block of addresses mapped to expansion ROM. And the 128 KB block of addresses below the 1 megabyte (MB) boundary is mapped to boot ROM (i.e., BIOS). Both DRAM space and PCI memory are mapped above the 1 MB boundary. Accordingly, two separate processing complexes may be executing within two distinct OS domains, which typically means that the two processing complexes are executing either two instances of the same operating system or that they are executing two distinct operating systems. However, in a symmetrical multi-processing environment, a plurality of processing complexes may together be executing a single instance of an SMP operating system, in which case the plurality of processing complexes would be associated with a single OS domain.

A problem that has been recognized by the present inventor is that the requirement to place a processing complex, interface and I/O within every computer is costly, and lacks modularity. That is, once a computer is purchased, all of the subsystems are static from the standpoint of the user. The ability to change a processing complex while still utilizing the interface and I/O is extremely difficult. The interface or chipset is typically so tied to the processing complex that swapping one without the other doesn't make sense. And, the I/O is typically integrated within the computer, at least for servers and business desktops, such that upgrade or modification of the I/O is either impossible or cost prohibitive.

An example of the above limitations is considered helpful. A popular network server designed by Dell Computer Corporation is the Dell PowerEdge 1750. This server includes one or more microprocessors designed by Intel (Xeon processors), along with memory (e.g., the processing complex). It has a server class chipset for interfacing the processing complex to I/O (e.g., the interface). And, it has onboard graphics for connecting to a display, onboard PS/2 for connecting a mouse/keyboard, onboard RAID control for connecting to data storage, onboard network interface controllers for connecting to 10/100 and 1 gig Ethernet; and a PCI bus for adding other I/O such as SCSI or Fiber Channel controllers. It is believed that none of the onboard features are upgradeable.

So, as mentioned above, one of the problems with this architecture is that if another I/O demand emerges, it is difficult, or cost prohibitive to implement the upgrade. For example, 10 gigabit Ethernet is on the horizon. How can this be easily added to this server? Well, perhaps a 10 gig Ethernet controller could be purchased and inserted onto the PCI bus. Consider a technology infrastructure that included tens or hundreds of these servers. To move to a faster network architecture requires an upgrade to each of the existing servers. This is an extremely cost prohibitive scenario, which is why it is very difficult to upgrade existing network infrastructures.

This one-to-one correspondence between the processing complex, the interface, and the I/O is also costly to the manufacturer. That is, in the example above, much of the I/O is manufactured on the motherboard of the server. To include the I/O on the motherboard is costly to the manufacturer, and ultimately to the end user. If the end user utilizes all of the I/O provided, then s/he is happy. But, if the end user does not wish to utilize the onboard RAID, or the 10/100 Ethernet, then s/he is still required to pay for its inclusion. This is not optimal.

Consider another emerging platform, the blade server. A blade server is essentially a processing complex, an interface, and I/O together on a relatively small printed circuit board that has a backplane connector. The blade is made to be inserted with other blades into a chassis that has a form factor similar to a rack server today. The benefit is that many blades can be located in the same rack space previously required by just one or two rack servers. While blades have seen market growth in some areas, where processing density is a real issue, they have yet to gain significant market share, for many reasons. One of the reasons is cost. That is, blade servers still must provide all of the features of a pedestal or rack server, including a processing complex, an interface to I/O, and I/O. Further, the blade servers must integrate all necessary I/O because they do not have an external bus which would allow them to add other I/O on to them. So, each blade must include such I/O as Ethernet (10/100, and/or 1 gig), and data storage control (SCSI, Fiber Channel, etc.).

One recent development to try and allow multiple processing complexes to separate themselves from I/O devices was introduced by Intel and other vendors. It is called Infiniband. Infiniband is a high-speed serial interconnect designed to provide for multiple, out of the box interconnects. However, it is a switched, channel-based architecture that is not part of the load-store architecture of the processing complex. That is, it uses message passing where the processing complex communicates with a Host-Channel-Adapter (HCA) which then communicates with all downstream devices, such as I/O devices. It is the HCA that handles all the transport to the Infiniband fabric rather than the processing complex. That is, the only device that is within the load/store domain of the processing complex is the HCA. What this means is that you have to leave the processing complex domain to get to your I/O devices. This jump out of processing complex domain (the load/store domain) is one of the things that contributed to Infinibands failure as a solution to shared I/O. According to one industry analyst referring to Infiniband, "[i]t was over-billed, overhyped to be the nirvana for everything server, everything I/O, the solution to every problem you can imagine in the data center . . . but turned out to be more complex and expensive to deploy . . . because it required installing a new cabling system and significant investments in yet another switched high speed serial interconnect".

Thus, the inventor has recognized that separation between the processing complex and its interface, and I/O, should occur, but the separation must not impact either existing operating systems, software, or existing hardware or hardware infrastructures. By breaking apart the processing complex from the I/O, more cost effective and flexible solutions can be introduced.

Further, the inventor has recognized that the solution must not be a channel-based architecture, performed outside of the box. Rather, the solution should use a load-store architecture, where the processing complex sends data directly to (or at least architecturally directly) or receives data directly from an I/O device (such as a network controller, or data storage controller). This allows the separation to be accomplished without affecting a network infrastructure or disrupting the operating system.

Therefore, what is needed is an apparatus and method which separates the processing complex and its interface to I/O from the I/O devices.

Further, what is needed is an apparatus and method which allows processing complexes and their interfaces to be designed, manufactured, and sold, without requiring I/O to be included within them.

Additionally, what is needed is an apparatus and method which allows a single I/O device to be shared by multiple processing complexes.

Further, what is needed is an apparatus and method that allows multiple processing complexes to share one or more I/O devices through a common load-store fabric.

Additionally, what is needed is an apparatus and method that provides switching between multiple processing complexes and shared I/O.

Further, what is needed is an apparatus and method that allows multiple processing complexes, each operating independently, and having their own operating system domain, to view shared I/O devices as if the I/O devices were dedicated to them.

And, what is needed is an apparatus and method which allows shared I/O devices to be utilized by different processing complexes without requiring modification to the processing complexes existing operating systems or other software. Of course, one skilled in the art will appreciate that modification of driver software may allow for increased functionality within the shared environment.

The previously filed applications from which this application depends address each of these needs. However, in addition to the above, what is further needed is an I/O device that can be shared by two or more processing complexes using a common load-store fabric.

Further, what is needed is a network interface controller which can be shared, or mapped, to one or more processing complexes (or OSD's) using a common load-store fabric. Network interface controllers, Ethernet controllers (10/100, 1 gig, and 10 gig) are all implementations of a network interface controller (NIC).

SUMMARY

The present invention provides a method and apparatus for distinguishing between local and global resources within a shareable network interface controller for purposes of configuration and reset. More specifically, the shareable network interface controller is shared by a plurality of operating system domains within their load-store architecture. Each of the plurality of operating system domains are allowed to configure and reset their local resources, but not local resources associated with other ones of the plurality of operating system domains. Further, registration logic is provided to authenticate one of the plurality of operating system domains as a reset (or management) master for purposes of configuration and reset of global resources.

In one aspect, the present invention provides a shareable network interface controller to be shared within the load-store architecture of each of a plurality of operating system domains. The controller includes a bus interface and registration logic. The bus interface couples the shareable network interface controller to each of the plurality of operating system domains. The registration logic is coupled to the bus interface, and registers one of the operating system domains as a master of the shareable network interface controller. Once registered, the master can configure or reset global resources within the controller.

In another aspect, the present invention provides a controller, shared by a plurality of operating system domains, accessed by load-store instructions which directly address the controller. The controller includes a bus interface to couple the controller to a load-store link which communicates with each of the plurality of operating system domains. The controller further includes OSD PCI Config logic coupled to the bus interface, which associates the controller with each of the plurality of operating system domains. The controller also includes a plurality of local resources, each associated with a different one of the plurality of operating system domains. And, the controller includes global resources utilized by the controller to support all of the plurality of operating system domains. The controller further includes registration logic to register one of the plurality of operating system domains as a master. Once registered, the master is responsible for performing management functions on the global resources.

In another aspect, the present invention provides a network interface controller that is shareable by a number of operating system domains by utilizing load-store instructions within their architecture. The controller includes local resources, global resources and a reset. Each of the local resources are associated with a different one of the operating system domains, whereas the global resources are utilized by the controller for processing of the load-store instructions for each of the operating system domains. A reset from one of the operating system domains causes a reset of its associated local resource, but does not cause other ones of the local resources to be reset.

In yet another aspect, the present invention provides a method for resetting a network interface controller within the load-store architecture of a plurality of operating system domains. The method includes: receiving a reset from one of the plurality of operating system domains; determining which one of the plurality of operating system domains sent the reset; and utilizing the reset to reset resources associated with the one of the plurality of operating system domains that sent the reset, while not resetting resources associated with other ones of the plurality of operating system domains.

In a further aspect, the present invention provides a method for insuring that only one of a plurality of operating system domains can reset global resources within a network interface controller that is shared by the plurality of operating system domains within their load-store architecture. The method includes: receiving a request by one of the plurality of operating system domains to be a reset master of the network interface controller; registering as reset master the one of the plurality of operating system domains that sent the request; upon registering the reset master, allowing the reset master to reset the global resources within the network interface controller.

Other features and advantages of the present invention will become apparent upon study of the remaining portions of the specification and drawings.

DETAILED DESCRIPTION

Although the present invention may be implemented in any of a number of load-store fabrics, the below discussion is provided with particular reference to PCI-Express. One skilled in the art will appreciate that although embodiments of the present invention will be described within the context of PCI Express, a number of alternative, or yet to be developed load/store protocols might be used without departing from the spirit and scope of the present invention.

By way of background, Peripheral Component Interconnect (PCI) was developed in the early 1990's by Intel Corporation as a general I/O architecture to transfer data and instructions faster than the ISA architecture of the time. PCI has gone thru several improvements since that time, with the latest proposal being PCI Express. In a nutshell, PCI Express is a replacement of the PCI and PCI-X bus specification to provide platforms with much greater performance, while using a much lower pin count (Note: PCI and PCI-X are parallel bus architectures, PCI Express is a serial architecture). A complete discussion of PCI Express is beyond the scope of this specification, but a thorough background and description can be found in the following books which are incorporated herein by reference for all purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com. In addition, the PCI Express specification is managed and disseminated through the Special Interest Group (SIG) for PCI found at www.pcisig.com.

This invention is also directed at describing a shared network interface controller. Interface controllers have existed to connect computers to a variety of networks, such as Ethernet, Token Ring, etc. However, Applicant's are unaware of any network interface controller that may be shared by multiple processing complexes as part of their load-store domain. While the present invention will be described with reference to interfacing to an Ethernet network, one skilled in the art will appreciate that the teachings of the present invention are applicable to any type of computer network.

Figure 1:
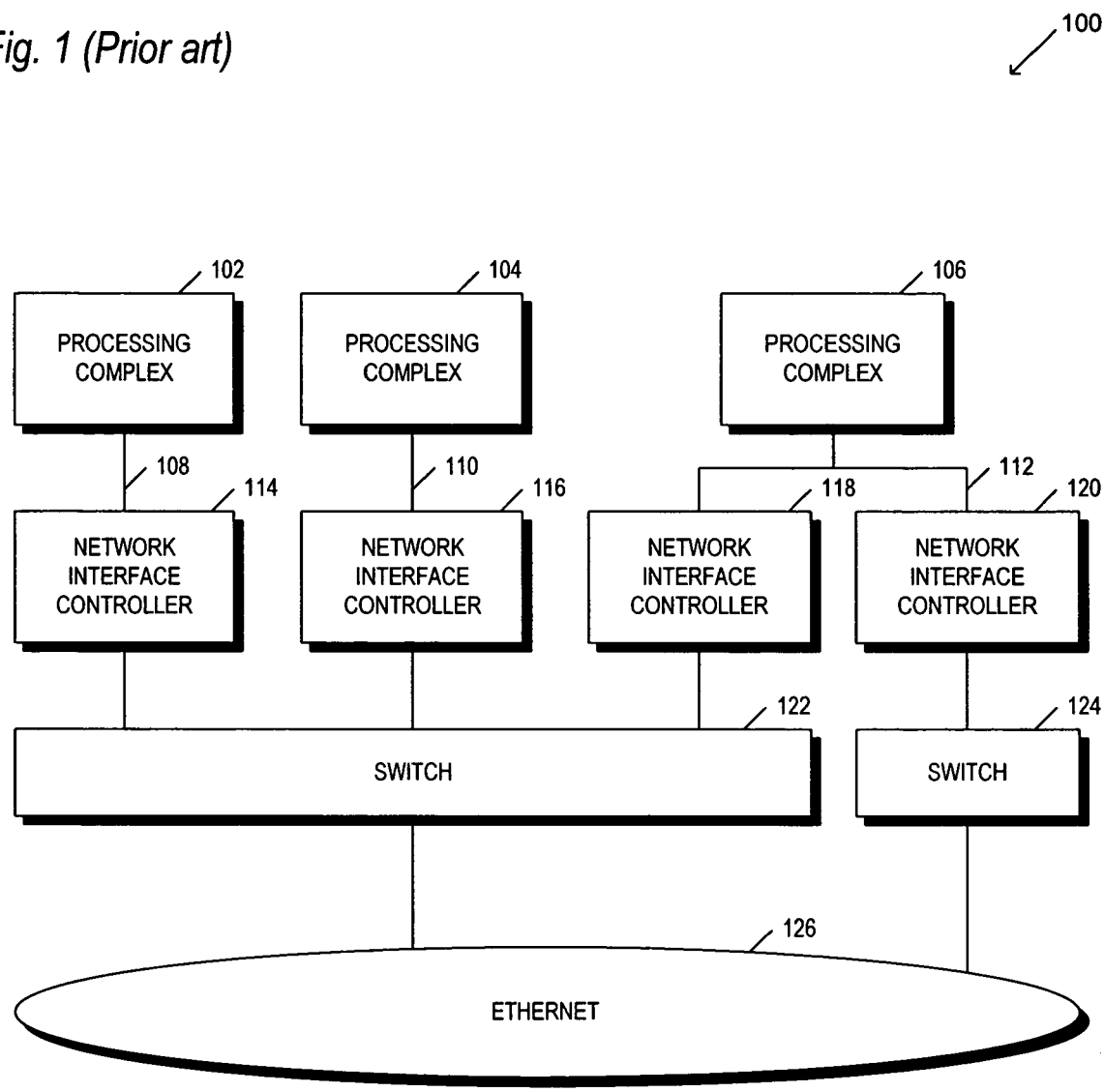
FIG. 1 is prior art block diagram of three processing complexes each with their own network interface controller (NIC) attached to an Ethernet network.

Referring now to FIG. 1, a block diagram 100 is provided illustrating three processing complexes 102, 104, 106, each having one or more network interface controllers 114, 116, 118, 120 for coupling the processing complexes 102, 104, 106 to the network 126 (via switches 122, 124). More specifically, processing complex 102 is coupled to network interface controller 114 via a load-store bus 108. The bus 108 may be any common bus such as PCI, PCI-X, or PCI-Express. Processing complex 104 is coupled to network interface controller 116 via load-store bus 110. Processing complex 106 is coupled to two network interface controllers 118, 120 via load-store bus 112. What should be appreciated by the Prior art illustration and discussion with respect to FIG. 1, is that each processing complex 102, 104, 106 requires its own network interface controller 114, 116, 118-120, respectively, to access the network 126.

Figure 2:
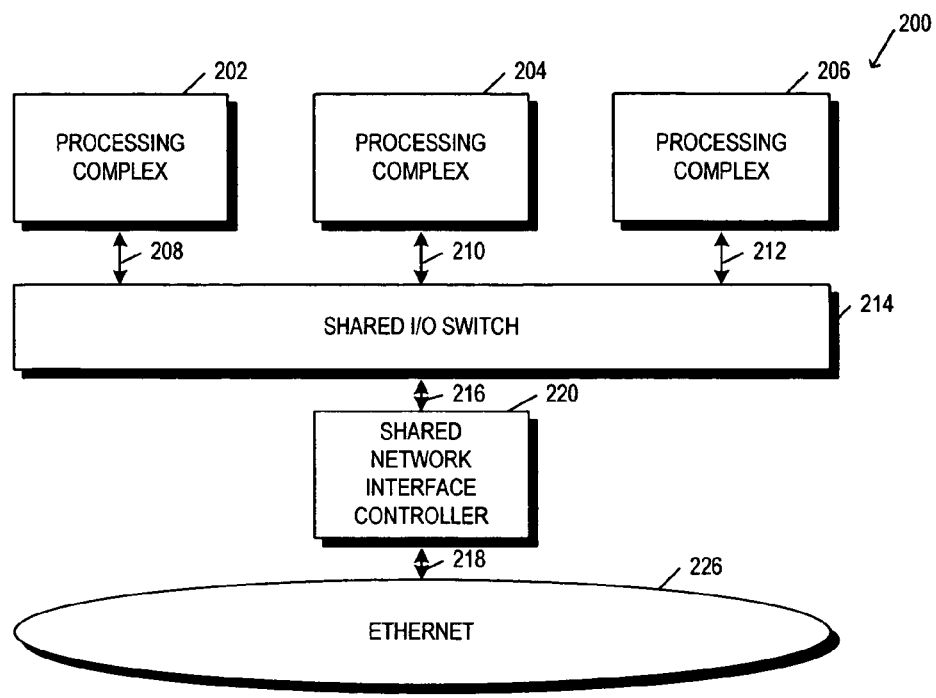
FIG. 2 is a block diagram of three processing complexes sharing a shared network interface controller via a shared I/O switch according to the present invention.

Referring now to FIG. 2, a block diagram 200 is shown which implements an embodiment of the present invention. More specifically, three processing complexes 202, 204, 206 are shown, each with their own load-store bus 208, 210, 212, coupled to a shared I/O switch 214. The shared I/O switch 214 is coupled to a shared network interface controller 220 via an operating system domain (OSD) aware load-store bus 216. Note: Details of one embodiment of an OSD aware load-store bus 216 are found in the parent applications referenced above. For purposes of the below discussion, this OSD aware load-store bus will be referred to as PCI-Express+. The shared network interface controller 220 is coupled to a network (such as Ethernet) 226.

As mentioned above, a processing complex may be as simple as a single microprocessor, such as a Pentium microprocessor, coupled to memory, or it might be as complex as two or more processors which share memory. The processing complex may execute a single operating system, or may execute multiple operating systems which share memory. In either case, applicant intends that from the viewpoint of the shared I/O switch 214, that whatever configuration of the processing complex, each load-store bus 208, 210, 212 be considered a separate operating system domain (OSD). At this point, it is sufficient that the reader understand that in the environment described with reference to FIG. 2, the load-store links 208, 210, 212 do not carry information to the shared I/O switch 214 that particularly associates the information with themselves. Rather, they utilize load-store links 208, 210, 212 as if they were attached directly to a dedicated network interface controller. The shared I/O switch 214 receives requests, and or data, (typically in the form of packets), over each of the load-store links 208, 210, 212. In the example of FIG. 2, the shared I/O switch 214 illustrates three upstream ports 208, 210, 212 coupled to the load-store links 208, 210, 212 which are non OSD aware, and one downstream port 216 coupled to an OSD aware load-store link 216. Although not shown, within the shared I/O switch 214 is a core, and mapping logic which tags, or associates packets received on the non OSD aware links 208, 210, 212 with their respective OSD. The shared I/O switch 214 then provides those packets to the downstream OSD aware link 216 with embedded information to associate those packets with their upstream link 208, 210, 212. Several alternatives of embedding OSD information into the packets was described in the parent applications, including, adding an OSD header to PCI-Express packets, and/or utilizing existing bits within PCI-Express, whether reserved or existing, to associate an originating OSD with a packet. Alternatively, the information to associate those packets with their upstream link 208, 210, 212 can be provided out of band via an alternate link (not shown). In either embodiment, the shared network interface controller 220 receives the OSD aware information via link 216 so that it can process the requests/data, per OSD.

In the reverse, when information flows from the network interface controller 220 to the shared I/O switch 214, the information is associated with the appropriate upstream link 208, 210, 212 by embedding (or providing out of band), OSD association for each piece of information (e.g., packet) transmitted over the link 216. The shared I/O switch 214 receives the OSD aware information via the link 216, determines which upstream port the information should be transmitted on, and then transmits the information on the associated link 208, 210, 212.

What should be appreciated by reference to FIG. 2 is that three processing complexes 202, 204, 206 all share the same shared network interface controller 220, which then provides them with access to the network 226. Complete details of the links 208, 210, 212 between the processing complexes 202, 204, 206 and the shared I/O switch 214 are provided in the parent applications which are referenced above and incorporated by reference. Attention will now be focused on the downstream OSD aware shared endpoint, particularly, embodiments of the shared network interface controller 220.

Figure 3:
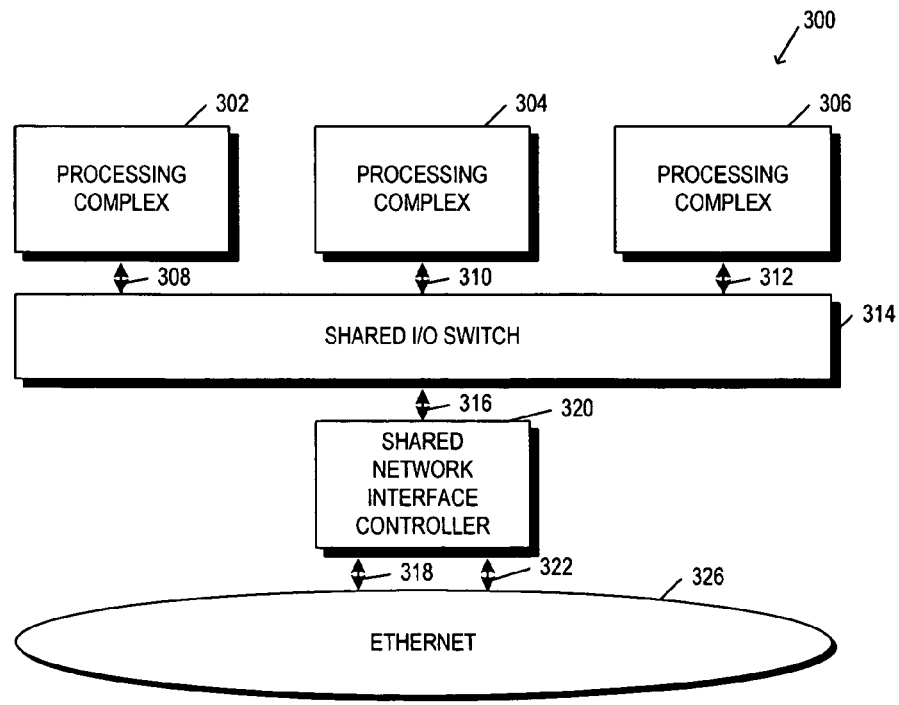
FIG. 3 is a block diagram of three processing complexes sharing a network interface controller having two Ethernet ports for coupling to an Ethernet according to the present invention.

Referring now to FIG. 3, a block diagram 300 is shown, substantially similar in architecture to the environment described above with respect to FIG. 2, elements referenced similarly, the hundred's digit being replaced with a 3. What is particularly called out, however, is a shared network interface controller 320 which has two connection ports 318, 322 coupling it to the network 326. The purpose of this is to illustrate that the network interface controller 320 should not be viewed as being a single downstream port device. Rather, the controller 320 may have 1-N downstream ports for coupling it to the network 326. In one embodiment, for example, the controller might have a 10/100 megabit port 318, and a 1 gigabit port 320. One skilled in the art will appreciate that other port speeds, or number of ports may also be utilized within the context of the present invention.

A detailed description of one embodiment of the shared network interface controller of the present invention will be described below with respect to FIG. 6. Operation of the shared network interface controller will later be described with reference to FIGS. 11-13. However, it is considered appropriate, before proceeding, to provide a high level overview of the operation of the system shown in FIG. 3.

Each of the processing complexes 302, 304, 306 are coupled to the shared I/O switch 314 via links 308, 310, 312. The links, in one embodiment, utilize PCI-Express. The shared I/O switch 314 couples each of the links 308, 310, 312 to downstream devices such as the shared network interface controller 320. In addition, the shared I/O switch 314 tags communication from each of the processing complexes 302, 304, 306 with an operating system domain header (OSD header) to indicate to the downstream devices, which of the processing complexes 302, 304, 306 is associated with the communication. Thus, when the shared network interface controller 320 receives a communication from the shared I/O switch 314, included in the communication is an OSD header. The controller 320 can utilize this header to determine which of the processing complexes 302, 304, 306 sent the communication, so that the controller 320 can deal with communication from each of the complexes 302, 304, 306 distinctly. In reverse, communication from the controller 320 to the processing complexes 302, 304, 306 gets tagged by the controller 320 with an OSD header, so that the shared I/O switch 314 can determine which of the processing complexes 302, 304, 306 the communication should be passed to. Thus, by tagging communication between the processing complexes 302, 304, 306 and the shared network interface controller 320 with an OSD header (or any other type of identifier), the controller 320 can distinguish communication between the different complexes it supports.

Figure 4:
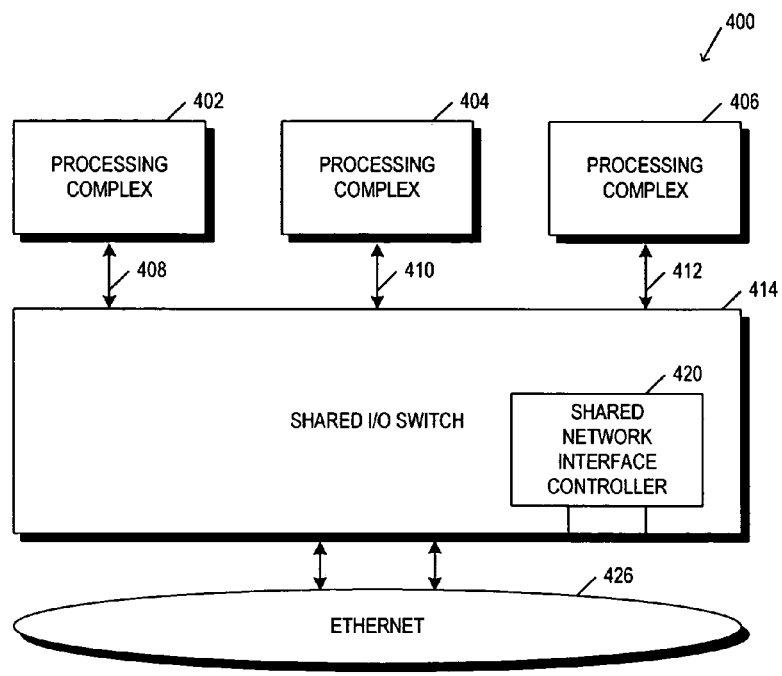
FIG. 4 is block diagram of three processing complexes communicating to a network using a shared switch having an embedded shared network interface controller according to the present invention.

Referring now to FIG. 4, a block diagram of an alternative embodiment of the present invention is shown, similar to that described above with respect to FIG. 3. Like references have like numbers, the hundreds digit replaced with a 4. In this embodiment, however, the shared I/O switch 414 has incorporated a shared network interface controller 420 within the switch. One skilled in the art will appreciate that such an embodiment is simply a packaging alternative to providing the shared network interface controller 420 as a separate device.

Figure 5:
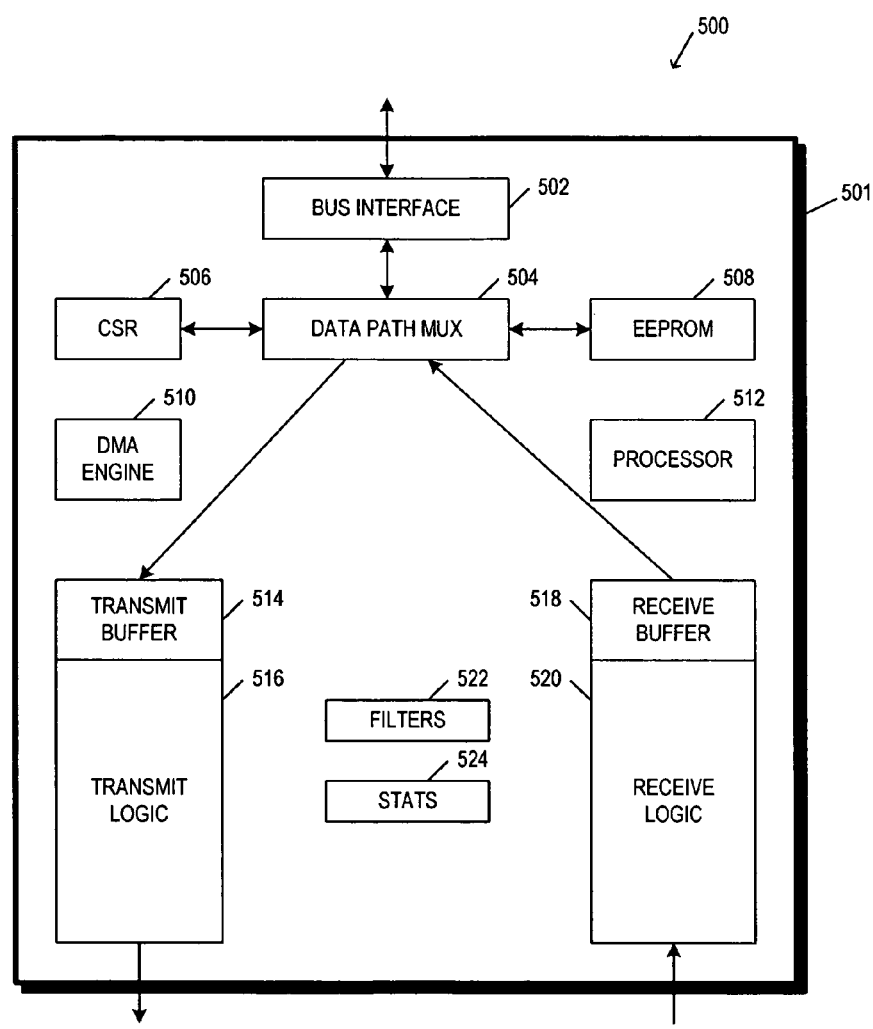
FIG. 5 is a block diagram of a prior art network interface controller.

Referring now to FIG. 5, a block diagram of a prior art non-shared network interface controller 500 is shown. The purpose of illustrating the prior art controller is not to detail an embodiment of an existing controller, but rather to provide a foundation so that differences between existing controllers and the shared controller of the present invention can be better appreciated. The controller 500 includes a bus interface 502 to interface the controller 502 to its computer (not shown). Modern controllers typically utilize some form of PCI (whether PCI, PCI-X, or PCI-Express is used) as their interface to their computer. The bus interface 502 is coupled to a data path mux 504 which provides an interface to the transmit and receive buffers 514, 518, respectively. The transmit and receive buffers 514, 518 are coupled to transmit and receive logic 516, 520, respectively which interface the controller to an Ethernet network (not shown). The controller further includes a CSR block 506 which provides the control status registers necessary for supporting communication to a single computer. And, the controller 500 includes a DMA engine 510 to allow data transfer from and to the computer coupled to the controller 500. In addition, the controller 500 includes an EEPROM 508 which typically includes programming for the controller 500, and the MAC address (or addresses) assigned to that controller for use with the computer to which it is coupled. Finally, the controller 500 includes a processor 512. One skilled in the art will appreciate that other details of an interface controller are not shown, but are not considered necessary to understand the distinctions between the prior art controller 500 and the shared network interface controller of the present invention.

Figure 6:
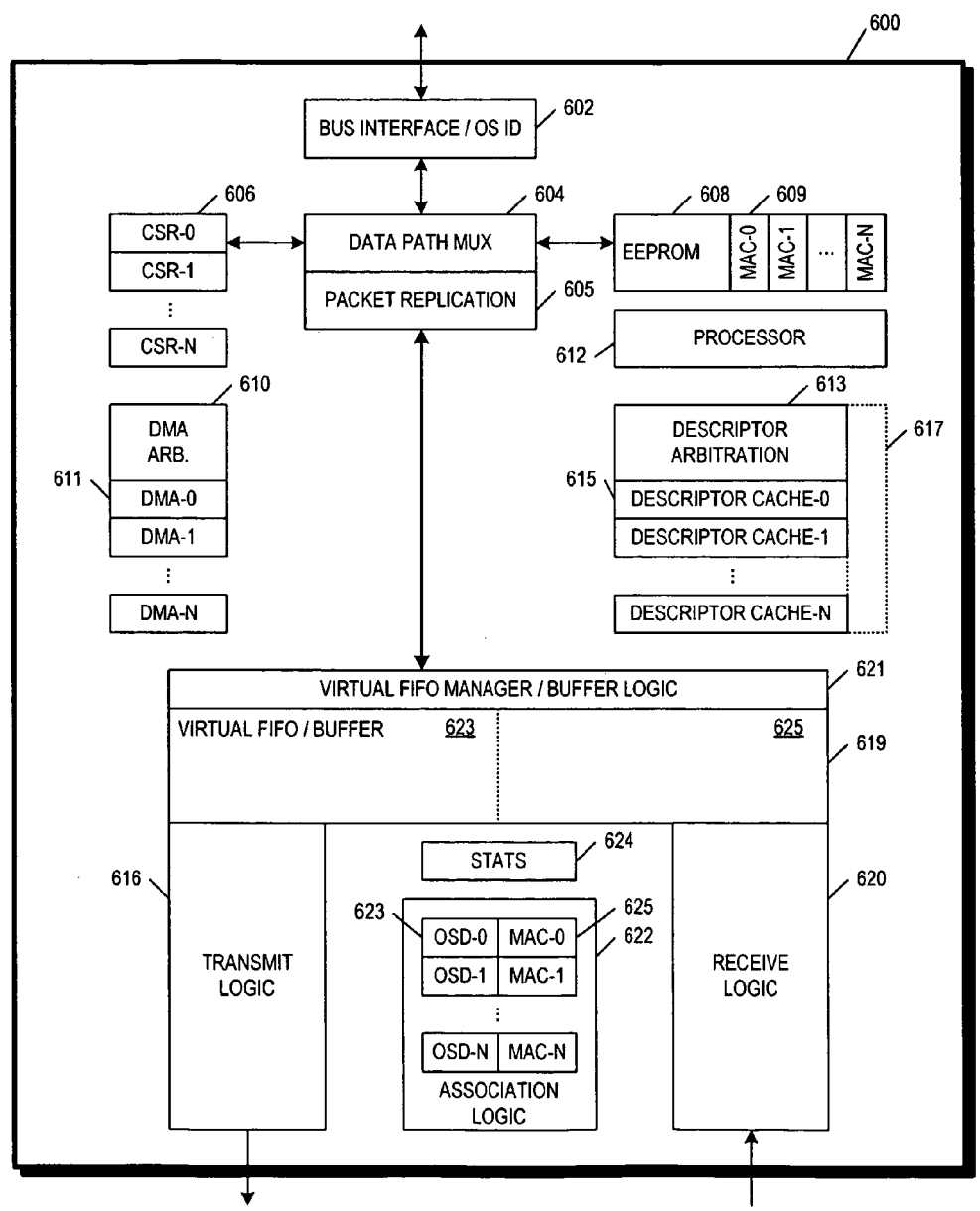
FIG. 6 is a block diagram of a network interface controller according to one embodiment of the present invention.

Referring now to FIG. 6, a block diagram is shown illustrating a shared network interface controller 600 according to the present invention. The controller 600 is illustrated with logic capable of supporting 1 to N number of distinct operating system domains. Thus, based on the desires of the manufacturer, the number of distinct operating system domains supported by the controller 600 of the present invention may be 2, 4, 8, 16, or any number desired by the manufacturer. Thus, rather than describing a controller 600 to support 2 or 3 operating system domains, applicant will describe the logic necessary to support 1 to N domains.

The controller 600 includes bus interface/OS ID logic 602 for interfacing the controller 600 to an upstream load/store shared I/O link such as described above with reference to FIGS. 2-3. As mentioned, one embodiment utilizes PCI-Express, but incorporates OSD header information to particularly call out which of the processing complexes the communication is from/to. Applicant's refer to this enhanced bus as PCI-Express+. Thus, the bus interface portion of the logic 602 provides the necessary electrical and logical operations to interface to PCI-Express, while the OSD ID portion of the logic 602 provides the necessary operations to determine for incoming communication, which of the upstream operating system domains are associated with the communication, and for outgoing communication, to tag the communication with the appropriate OSD for its upstream operating system domain.

The bus interface/OS ID logic 602 is coupled to a data path mux 604. The mux 604 is coupled to packet replication logic 605. In one embodiment, the packet replication logic 605 is used for loopback, multi-cast and broadcast operations. More specifically, since packets originating from one of the processing complexes may be destined for one or more of the other processing complexes for which the shared network interface controller 600 is coupled, the packet replication logic 605 performs the function of determining whether such packets should be transmitted to the Ethernet network, or alternatively, should be replicated and presented to one or more of the other processing complexes to which the controller 600 is coupled. Details of a multicast operation will be described below with reference to FIG. 13. And, details of the packet replication logic will be provided below with reference to FIG. 18.

The mux 604 is also coupled to a plurality of CSR blocks 606. As mentioned above, to establish communication to an operating system domain, a controller must have control status registers which are addressable by the operating system domain. These control status registers 606 have been duplicated in FIG. 6 for each operating system domain the designer desires to support (e.g., 2, 4, 8, 16, N). In one embodiment, to ease design, each of the CSR's 606 which are required to support an operating system domain (OSD) are duplicated for each supported OSD. In an alternative embodiment, only a subset of the CSR's 606 are duplicated, those being the registers whose contents will vary from OSD to OSD. Other ones of the CSR's 606 whose contents will not change from OSD to OSD may be not be duplicated, but rather will simply be made available to all supported OSD's. In one embodiment, the minimum number of CSR's 606 which should be duplicated includes the head and tail pointers to communicate with the OSD. And, if the drivers in the OSD are restricted to require that they share the same base address, then even the base address register (BAR) within the type 0 configuration space (e.g., in a PCI-Express environment) need not be duplicated. Thus, the requirement of duplicating some or all of the CSR's 606 is a design choice, in combination with the whether or not modifications to the software driver are made.

Figure 17:
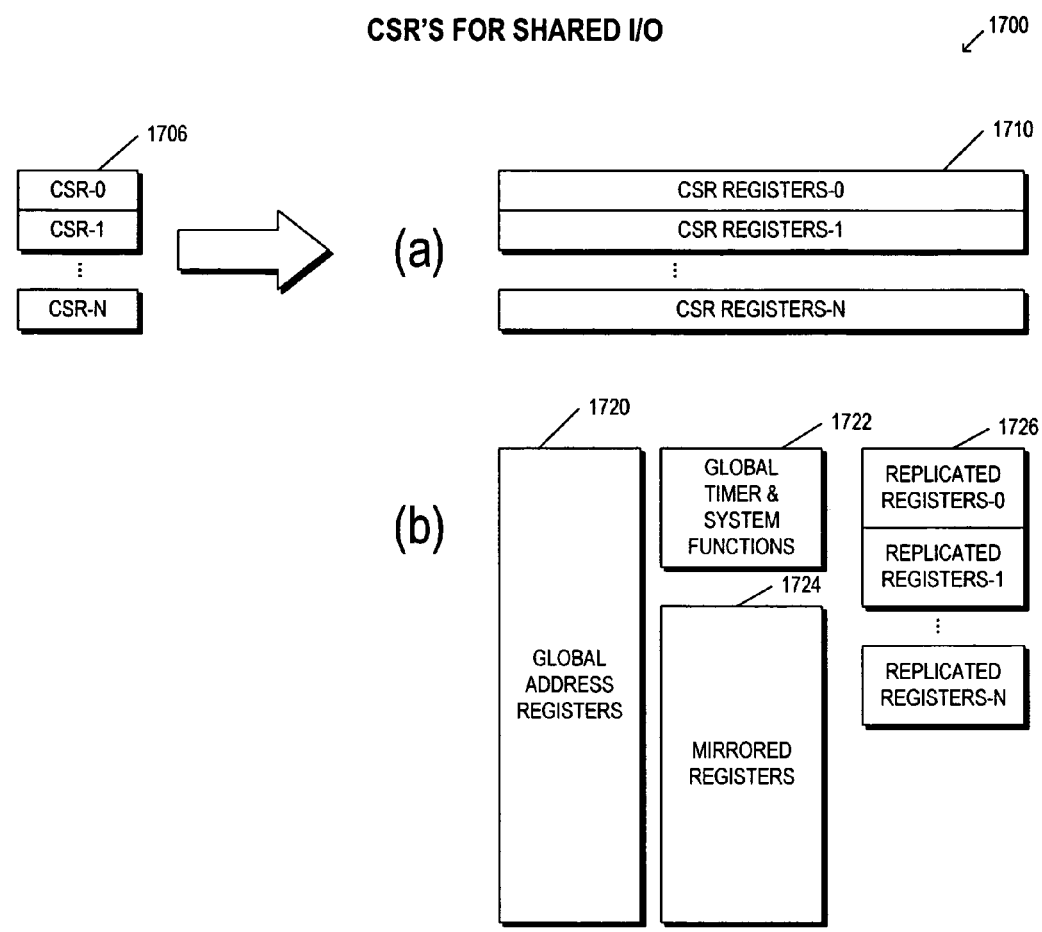
FIG. 17 is a block diagram illustrating alternative embodiments of control status registers within the shared network interface controller of the present invention.

Referring to FIG. 17, a block diagram illustrating a logical view of CSR block 606 is shown. More specifically, a first embodiment (a) illustrates a duplication of all of the CSR registers 606, one per supported OSD, as CSR registers 1710. Alternatively, a second embodiment (b) illustrates providing global timing and system functions 1722 to all supported OSD's, providing mirrored registers 1724 for others of the control status registers, and replicating a small set of registers 1726 (such as the head and tail pointers), per OSD. Applicant believes that embodiment (b) requires very little impact or change to the architecture of existing non shared controllers, while allowing them to utilize the novel aspects of the present invention. Moreover, as described above, the physical location of the CSR blocks need not reside on the same chip. For example, the global functions of the CSR block (such as timing and system functions) may reside on the controller 600, while the mirrored and/or replicated registers may be located in another chip or device. Thus, whether or not the CSR functions reside on the same chip, or are split apart to reside in different locations, both are envisioned by the inventor.

In one embodiment, the CSR's 606 contain the Control and Status Registers used by device drivers in the OSD's to interface to the controller 600. The CSR's 606 are responsible for generating interrupts to the interface between the OSD's and the controller 600. The CSR's 606 also include any generic timers or system functions specific to a given OSD. In one embodiment, there is one CSR set, with several registers replicated per each OSD. The following table describes some of the CSR registers 606 of an embodiment. Mirrored registers map a single or global function/register into all OSD's. Note that in some cases the registers may be located in separate address locations to ensure that an OSD does not have to do Byte accesses or RMW.

| Register Name | Bits | Replicated/ Mirrored | Function |
| --- | --- | --- | --- |
| INT Status | 16 | Replicated | Contains all INT Status |
| DMA Status | 16 | Replicated | Contains General status of DMA activity |
| RX CMD | 8 | Replicated | Initiates RX Descriptor Activity |
| TX CMD | 8 | Replicated | Initiates TX Descriptor Activity |
| Descriptor Location | 64 | Replicated | Base address for descriptor rings and general status pool in driver ownedmemory |
| Selective Reset | 4 | Replicated | Reset of various states of the chip |
| Pwr Mgt | 8 | Replicated | Status and control of Power Management Events and Packets |

-continued

| Register Name | Bits | Replicated/ Mirrored | Function |
|---|---|---|---|
| MDI Control | 32 | Replicated | Management bus access for PHY |
| TX Pointers | 16 | Replicated | Head/Tail pointers for TX descriptor |
| RX Pointers | 16 | Replicated | Head/Tail pointers for RX descriptor |
| General CFG | 32 | Replicated | General Configuration parameters |
| INT Timer | 16 | Replicated | Timer to moderate the number of INT's sent to a given OS domain |
| EEPROM R/W | 16 | Mirrored | Read and Write of EEPROM Data |
| General Status | 8 | Mirrored | Chip/Link wide status indications |
| RX-Byte Count | 32 | Mirrored | Byte count of RX FIFO status (Debug Only) |
| Flow Control | 16 | Mirrored | Status and CFG of MAC XON/XOFF |

Referring back to FIG. 6, coupled to the mux 604 is an EEPROM 608 having N MAC addresses 609. As mentioned above with respect to FIG. 5, a network interface controller is typically provided with one (or more) MAC addresses which associate the controller with a single OSD (e.g., one MAC address per network port). However, since the controller 600 will be associated with multiple OSD's, the manufacturer of the controller 600 will provide 1-N MAC addresses, depending on how many OSD's are supported by the controller 600, and how many ports per OSD are supported by the controller 600. For example, a controller 600 with 2 network ports (e.g., 1 gig and 10 gig), for each of 4 OSD's, would provide 8 MAC addresses. One skilled in the art will appreciate that the "N" designation for the number of DMA engines is thus not correlated to the "N" number of operating system domains supported by the controller 600. That is, the number of DMA engines is not directly associated with the number of OSD's supported.

The controller 600 further includes DMA logic having DMA arbitration 610 coupled to a number of DMA engines 611. Since the controller 600 will be supporting more than one OSD, additional DMA engines 611 allow increased performance for the controller 600, although additional DMA engines 611 are not required. Thus, one DMA engine 611 could be handling communication from a first OSD, while a second DMA engine 611 could be handling communication from a second OSD. Or, one DMA engine 611 could be handling transmit communication from a first OSD, while a second DMA engine 611 could be handling receive communication for the first OSD. Thus, it is not intended to necessarily provide a DMA engine 611 per supported OSD. Rather, the manufacturer may provide any number of DMA engines 611, according to the performance desired. Further, the DMA arbitration 610 may be configured to select/control utilization of the DMA engines 611 according to predefined criteria. One simple criteria would simply be a round robin selection of engines 611 by the supported OSD's. Another criteria would designate a DMA engine per OSD. Yet another criteria would associate particular DMA engines with either transmit or receive operations. Specifics associated with DMA arbitration are beyond the scope of the present application. However, one skilled in the art should appreciate that it is not the arbitration schemes which are important to the present application, but rather, the provision of 1-N DMA engines, along with appropriate arbitration, to allow for desired performance to be obtained for a desired number of supported OSD's.

The controller 600 further includes descriptor logic having descriptor arbitration 613, a plurality of descriptor caches 615, and in one embodiment descriptor tags 617. One skilled in the art will appreciate that present non shared network interface controllers contain a descriptor cache for storing transmit/receive descriptors. The transmit/receive descriptors are associated with the OSD to which the non shared controller is attached. The descriptors are retrieved by the non shared controller from the memory system of the OSD, and are used to receive/transmit data from/to the OSD. With the shared network interface controller 600 of the present invention, descriptors must be available within the controller 600 for each of the supported OSD's. And, each of the descriptors must be associated with their specific OSD. Applicant has envisioned a number of embodiments for providing descriptors for multiple OSD's, and has illustrated these embodiments in FIG. 8, to which attention is now directed.

Figure 8:
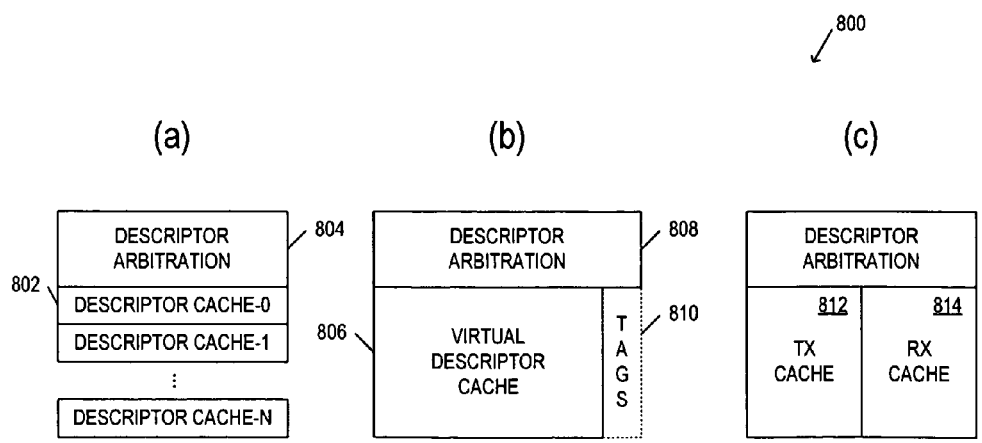
FIG. 8 is a block diagram of alternative embodiments of descriptor logic according to the present invention.

FIG. 8 provides three embodiments (a), (b), (c), 800 of descriptor cache arrangements for the controller 600. Embodiment (a) includes a plurality of descriptor caches 802 (1-N), thereby duplicating a descriptor cache of a non shared controller, and providing a descriptor cache for each supported OSD. In this embodiment, descriptors for OSD "0" would be stored in descriptor cache "0", descriptors for OSD "1" would be stored in descriptor cache "1", etc. Moreover, while not specifically illustrated, it should be appreciated that the descriptor caches 802 for each supported OSD include a transmit descriptor cache portion and a receive descriptor cache portion. These transmit/receive portions may be either the same size, or may be different in size, relative to each other. This embodiment would be easy to implement, but might require more on-controller memory than is desired.

Embodiment (b) includes a virtual descriptor cache 806 having tags 810. The virtual descriptor cache 806 may be used to store descriptors for any of the supported OSD's. But, when a descriptor is retrieved from a particular OSD, that OSD's header (or some other identifier) is placed as a tag which is associated with that descriptor. Thus, the controller can readily identify which of the descriptors in the virtual descriptor cache 806 are associated with which one of the supported OSD's. In this embodiment, descriptor arbitration 808 is used to insure that each supported OSD is adequately supported by the virtual descriptor cache 806. For example, the virtual descriptor cache 806 caches both transmit and receive descriptors for all of the supported OSD's. One scenario would allocate equal memory space to transmit descriptors and receive descriptors (such as shown in embodiment (c) discussed below. An alternative scenario would allocate a greater portion of the memory to transmit descriptors. Further, the allocation of memory to either transmit or receive descriptors could be made dynamic, so that a greater portion of the memory is used to store transmit descriptors, until the OSD's begin receiving a greater portion of receive packets, at which time a greater portion of the memory would be allocated for receive descriptors. And, the allocation of transmit receiver cache could be equal across all supported OSD's, or alternatively, could be based on pre-defined criteria. For example, it may be established that one or more of the OSD's should be given higher priority (or rights) to the descriptor cache. That is, OSD "0" might be allocated 30% of the transmit descriptor cache, while the other OSD's compete for the other 70%. Or, rights to the cache 806 may be made in a pure round-robin fashion, giving each OSD essentially equal rights to the cache for its descriptors. Thus, whether the allocation of fifo cache between transmit and receive descriptors, and/or between OSDs is made equal, or is made unequal based on static criteria, or is allowed to fluctuate based on dynamic criteria (e.g., statistics, timing, etc.), all such configurations are anticipated by the inventor.

One skilled in the art will appreciate that the design choices made with respect to descriptor size, and arbitration, is a result of trying to provide ready access to descriptors, both transmit and receive, for each supported OSD, while also trying to keep the cost of the controller 600 close to the cost of a non shared controller. Increasing the descriptor cache size impacts cost. Thus, descriptor arbitration schemes are used to best allocate the memory used to store the descriptors in a manner that optimizes performance. For example, if all of the descriptor memory is taken, and an OSD needs to obtain transmit descriptors to perform a transmit, a decision must be made to flush certain active descriptors in the cache. Which descriptors should be flushed? For which OSD? What has been described above are a number of descriptor arbitration models, which allow a designer to utilize static or dynamic criteria in allocating descriptor space, based on the type of descriptor and the OSD.

In embodiment (c), a virtual transmit descriptor cache 812 is provided to store transmit descriptors for the supported OSD's, and a virtual receive descriptor 814 is provided to store receive descriptors for the supported OSD's. This embodiment is essentially a specific implementation of embodiment (b) that prevents transmit descriptors for one OSD from overwriting active receive descriptors. Although not shown, it should be appreciated that tags for each of the descriptors are also stored within the transmit/received caches 812, 814, respectively.

What should be appreciated from the above is that for the shared network interface controller 600 to support multiple OSD's, memory/storage must be provided on the controller 600 for storing descriptors, and some mechanism should exist for associating the descriptors with their OSD. Three embodiments for accomplishing the association have been shown but others are possible without departing from the scope of the present invention.

Referring back to FIG. 6, the controller 600 further includes a processor 612 for executing controller instructions, and for managing the controller. And, the controller includes a buffer 619 coupled to transmit logic 616 and receive logic 620. The transmit logic performs transfer of data stored in the buffer 619 to the network. The receive logic 620 performs transfer of data from the network to the buffer 619. The buffer includes a virtual fifo 623 and a virtual fifo 625, managed by virtual fifo manager/buffer logic 621. The purpose of the buffer 619 is to buffer communication from the plurality of supported OSD's and the network. More specifically, the buffer 619 provides temporary storage for communication transferred from the OSD's to the controller 600, and for communication transferred from the network to the OSD's.

Figure 7:
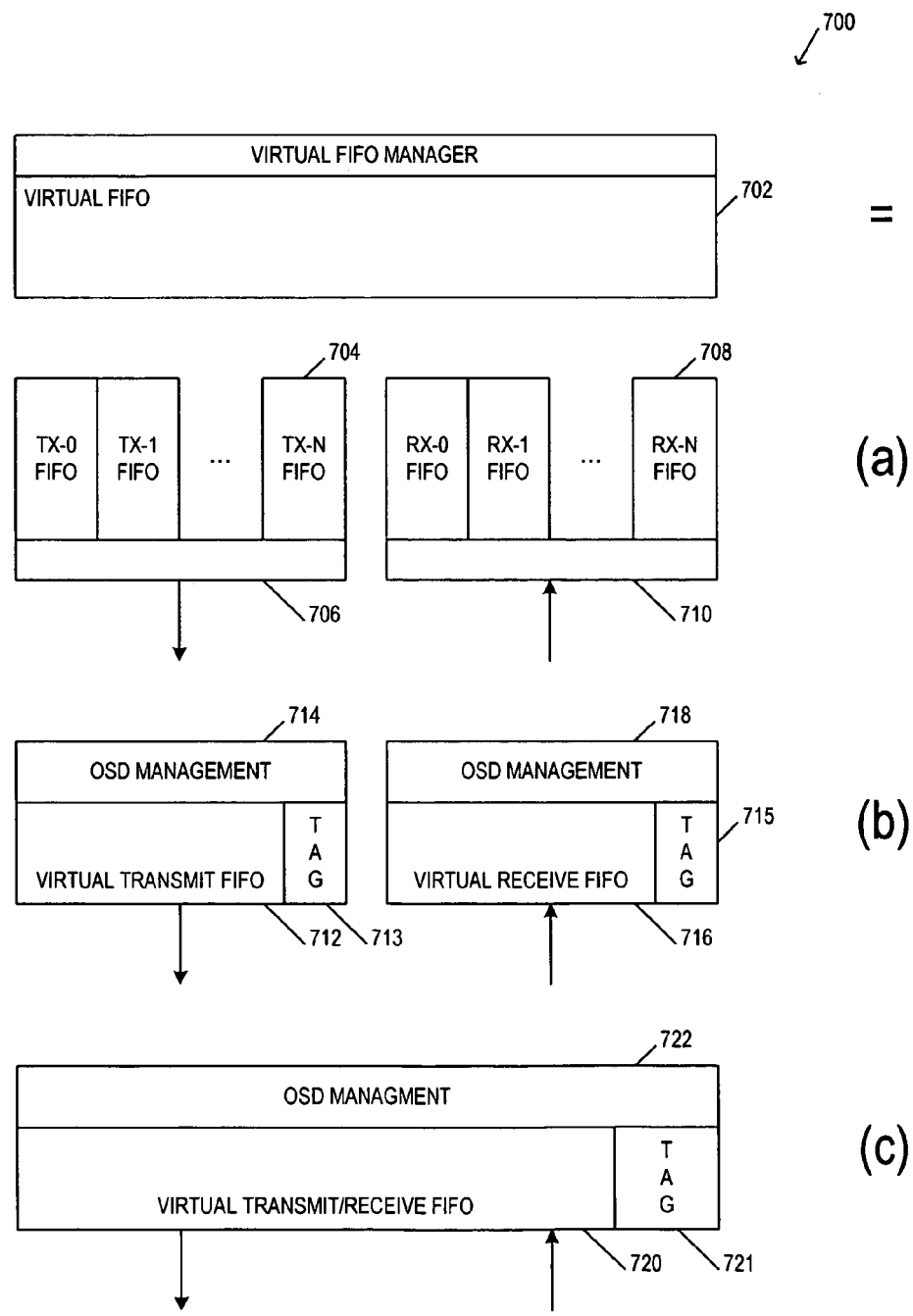
FIG. 7 is a block diagram of alternative embodiments of a transmit/receive fifo according to the present invention.

A number of embodiments for accomplishing such buffering are envisioned by the applicant, and are illustrated in FIG. 7 to which attention is now directed. More specifically, three embodiments (a), (b), (c) are shown which perform the necessary buffering function. Embodiment (a) includes 1-N transmit fifo's 704, and 1-N receive fifo's 708, coupled to transmit/receive logic 706/710 respectively. In this embodiment, a transmit fifo is provided for, and is associated with, each of the OSD's supported by the shared network controller 600. And, a receive fifo is provided for, and is associated with, each of the OSD's supported by the shared network controller 600. Thus, communication transmitted from OSD "0" is placed into transmit fifo "0", communication transmitted from OSD "1" is placed into transmit fifo "1" and communication to be transmitted to OSD "N" is placed into receive fifo "N". Since transmit/receive fifos 704, 708 are provided for each OSD, no tagging of data to OSD is required.

Embodiment (b) provides a virtual transmit fifo 712 and a virtual receive fifo 716, coupled to OSD management 714, 718, respectively. In addition, the transmit fifo 712 includes tag logic 713 for storing origin OSD tags (or destination MAC address information) for each packet within the fifo 712, and the receive fifo 716 includes tag logic 715 for storing destination OSD tags (or destination MAC address information) for each packet within the fifo 716. The virtual fifo's are capable of storing communication from/to any of the supported OSD's as long as the communication is tagged or associated with its origin/destination OSD. The purpose of the OSD management 714, 718 is to insure such association. Details of how communication gets associated with its OSD will be described below with reference back to FIG. 6.

Embodiment (c) provides a single virtual fifo 720, for buffering both transmit and receive communication for all of the supported OSD's, and tag logic 721 for storing tag information to associate transmit and receive communication with the supported OSD's, as explained with reference to embodiment (b). The single virtual fifo is coupled to OSD management 722, as above. The OSD management 722 tags each of the communications with their associated OSD, and indicates whether the communication is transmit or receive. One skilled in the art will appreciate that although three embodiments of transmit/receive fifo's are shown, others are possible. What is important is that the controller 600 provide buffering for transmit/receive packets for multiple OSD's, which associates each of the transmit/receive packets with their origin or destination OSD(s).

Referring back to FIG. 6, the controller 600 further includes association logic 622 having 1-N OSD entries 623, and 1-N MAC address entries 625. At configuration, for each of the OSD's that will be supported by the controller 600, at least one unique MAC address is assigned. The OSD/MAC association is stored in the association logic 622. In one embodiment, the association logic 622 is a look up table (LUT). The association logic 622 allows the controller 600 to associate transmit/receive packets with their origin/destination OSD. For example, when a receive packet comes into the controller 600 from the network, the destination MAC address of the packet is determined, and compared with the entries in the association logic 622. From the destination MAC address, the OSD(s) associated with that MAC address is determined. From this determination, the controller 600 can manage transfer of this packet to the appropriate OSD by placing its OSD header in the packet transferred from the controller 600 to shared I/O switch. The shared I/O switch will then use this OSD header to route the packet to the associated OSD.

The controller 600 further includes statistics logic 624. The statistics logic provides statistics, locally per OSD, and globally for the controller 600, for packets transmitted and received by the controller 600. For example, local statistics may include the number of packets transmitted and/or received per OSD, per network port. Global statistics may included the number of packets transmitted and/or received per network port, without regard to OSD. Further, as will be explained further below, it is important for loopback, broadcast, and multicast packets, to consider the statistics locally per OSD, and globally, as if such packets were being transmitted/received through non shared interface controllers. That is, a server to server communication through the shared network interface controller should have local statistics that look like X packets transmitted by a first OSD, and X packets received by a second OSD, even though as described below with reference to FIG. 12, such packets may never be transmitted outside the shared controller 600.

What has been described above is one embodiment of a shared network interface controller 600, having a number of logical blocks which provide support for transmitting/receiving packets to/from a network for multiple OSD's. To accomplish the support necessary for sharing the controller 600 among multiple OSD's, blocks which are considered OSD specific have been replicated or vitualized with tags to associate data with its OSD. Association logic has also been provided for mapping an OSD to one (or more) MAC addresses. Other embodiments which accomplish these purposes are also envisioned.

Further, one skilled in the art will appreciate that the logical blocks described with reference to FIG. 6, although shown as part of a single controller 600, may be physically placed into one or more distinct components. For example, the bus interface and OS ID logic 602 may be incorporated in another device, such as in the shared I/O switch described in FIG. 2. And, other aspects of the controller 600 (such as the replicated CSR's, descriptor cache(s), transmit/receive fifo's, etc. may be moved into another device, such as a network processor, or shared I/O switch, so that what is required in the network interface controller is relatively minimal. Thus, what should be appreciated from FIG. 6 is an arrangement of logical blocks for implementing sharing of an interface to a network, without regard to whether such arrangement is provided within a single component or chip, separate chips, or located disparately across multiple devices.

Figure 9:
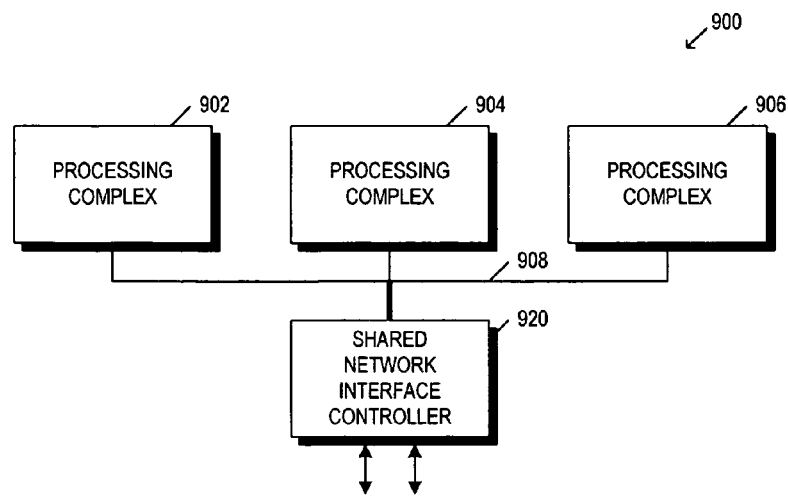
FIG. 9 is a block diagram illustrating three processing complexes coupled to a network interface controller which incorporates a shared I/O switch, according to the present invention.

Referring now to FIG. 9, a block diagram is shown of an alternative embodiment 900 of the present invention. More specifically, the processing complexes 902, 904, 906 are shown coupled directly to a shared network interface controller 920 via an OSD aware load-store bus 908. In this embodiment, each of the processing complexes 902, 904, 906 have incorporated OSD aware information in their load-store bus 908, so that they may be coupled directly to the shared network interface controller 920. Alternatively, the load-store bus 908 is not OSD aware, but rather, the shared network interface controller 920 incorporates a shared I/O switch within the controller, and has at least three upstream ports for coupling the controller 920 to the processing complexes. Such an embodiment is particularly shown in FIG. 10 to which attention is now directed.

Figure 10:
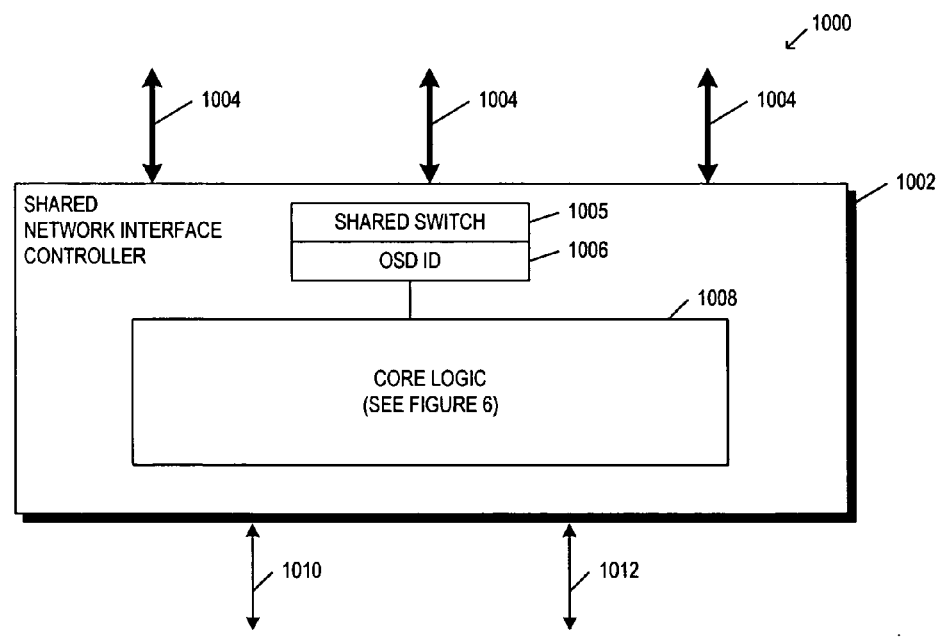
FIG. 10 is a block diagram illustrating the shared network interface controller of FIG. 9.

FIG. 10 illustrates a shared network interface controller 1002 having three load-store buses 1004 for coupling the controller 1002 to upstream processing complexes. In this embodiment, the load-store buses 1004 are not OSD aware. The controller 1002 contains a shared i/o switch 1005, and OSD ID logic 1006 for associating communication from/to each of the processing complexes with an OS identifier. The OSD ID logic 1006 is coupled via an OS aware link to core logic 1008, similar to that described above with respect to FIG. 6. Applicant intends to illustrate in these Figures that the shared network interface controller of the present invention may be incorporated within a shared I/O switch, or may incorporate a shared I/O switch within it, or may be coupled directly to OSD aware processing complexes. Any of these scenarios are within the scope of the present invention.

Figure 11:
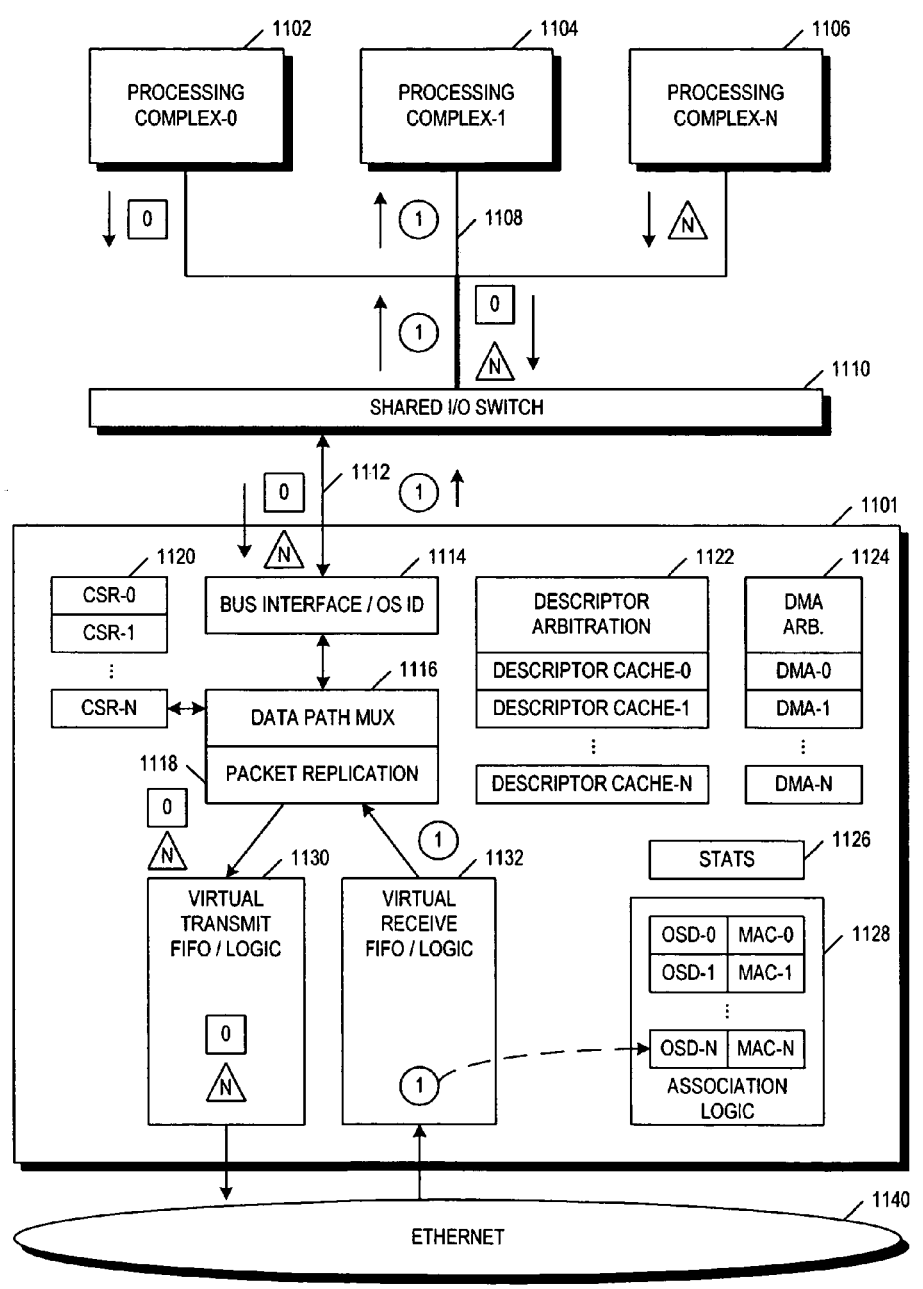
FIG. 11 is a block diagram illustrating packet flow through the shared network interface controller according to the present invention.

Referring now to FIG. 11, a block diagram 1100 is shown which illustrates packet flow through the shared network interface controller of the present invention. More specifically, processing complexes 1102, 1104, 1106 (designated as "0", "1", "N", to indicate 1-N supported processing complexes) are coupled via a non OSD aware load-store link 1108 to a shared I/O switch 1110. The switch 1110 is coupled to a shared network interface controller 1101 similar to that described with reference to FIG. 6. The controller 1101 is coupled to a network 1140 such as Ethernet. With respect to FIGS. 11-13, packets originating from or destined for processing complex 1102 ("0") are illustrated inside a square, with the notation "0". Packets originating from or destined for processing complex 1104 ("1") are illustrated inside a circle, with the notation "1". Packets originating from or destined for processing complex 1106 ("N") are illustrated inside a triangle, with the notation "N". In this example, each of the packets "0", "1", and "N" are unicast packets. Flow will now be described illustrating transmit packets "0" and "N" from processing complexes 1102, 1106 respectively, and receive packet "1" to processing complex 1104, through the shared network interface controller 1101.

At some point in time, processing complex 1102 alerts the controller 1101 that it has packet "0" in its memory, and requires that it be transferred to the network. Typically, this is accomplished by writing into a head pointer within the CSR 1120 associated with that processing complex 1102. The controller 1101 will arbitrate for one of the dma engines 1124 to dma the descriptors associated with the packet into its descriptor cache 1122. The controller will then use the descriptors, and initiates a dma of the packet into its virtual transmit fifo 1130. When the packet is placed into the fifo 1130, a tag indicating the OSD origin of the packet is placed into the fifo 1130 along with the packet.

At another point in time, processing complex 1106 alerts the controller 1101 that it has packet "N" in its memory, and requires that it be transferred to the network. The controller 1101 obtains the descriptors for packet "N" similar to above, and then dma's the packet into the fifo 1130.

As shown, the packets arrive in the order "N", then "0", and are placed into the fifo 1130 in that order. The packets are then transmitted to the network 1140.

Also, at some point in time, packet "1" is received from the network 1140 and is placed into the receive fifo 1132. Upon receipt, the destination MAC address of the packet is looked up in the association logic 1128 to determine which OSD corresponds to the packet. In this case, processing complex 1104 ("1") is associated with the packet, and the packet is tagged as such within the fifo 1132. Once the packet is in the fifo 1132, the controller 1101 determines whether receive descriptors exist in the descriptor cache 1122 for processing complex 1104. If so, it uses these descriptors to initiate a dma of the packet from the controller 1101 to processing complex 1104. If the descriptors do not exist, the controller 1101 obtains receive descriptors from processing complex 1104, then dma's the packet to processing complex 1104 to the memory locations specified by the descriptors. Communication to the processing complex 1104 from the controller 1101 contains OSD header information, specifically designating to the shared I/O switch 1110 which of its upstream processing complexes 1102, 1104, 1106 the communication is intended.

The description above with respect to FIG. 11 provides a general understanding of how transmit/receive packets flow between the processing complexes and the network. Packet flow will now be described with respect to a multicast transmit packet. One skilled in the art will appreciate that a multicast packet is a packet tagged as such in the packet header, and thus determined to be a multicast packet when the packet is received, either from an originating OSD, or from the network. The multicast packet is compared against filters (perfect and hash filters being the most common), and virtual lans (VLAN's), that are established by the driver, and maintained per OSD, to determine if the packet is destined for any of the OSD's supported by the shared controller.

Figure 12:
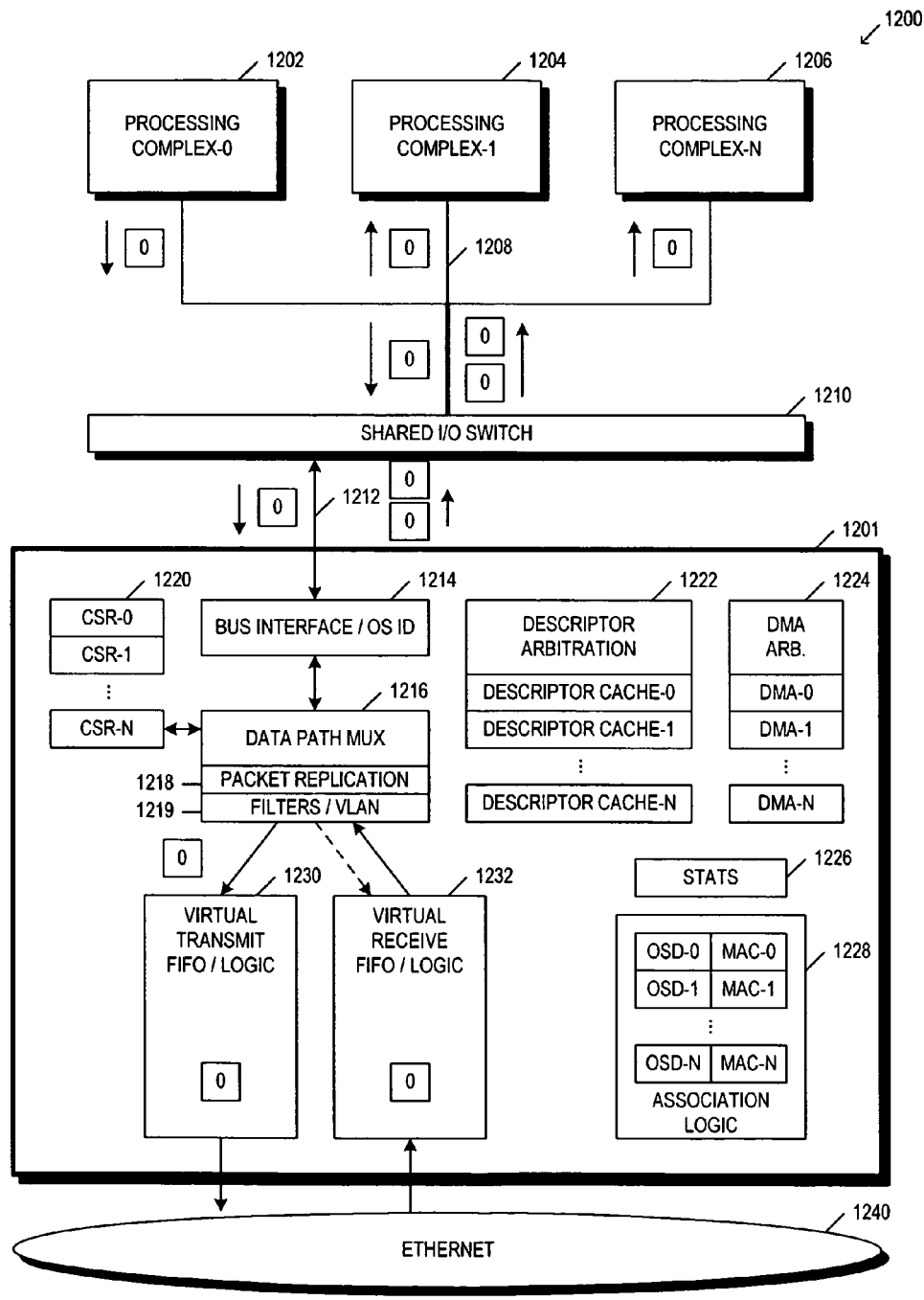
FIG. 12 is a block diagram illustrating packet flow for a multicast transmit operation through the shared network interface controller according to the present invention.

Referring now to FIG. 12, a block diagram similar to that described above with respect to FIG. 11 is shown, reference elements being the same, the hundreds digits replaced with a 12. In addition, the perfect/hash filters, and VLAN logic (per OSD) 1219 is shown included within the replication logic 1218. In this case, a transmit packet "0" originates from processing complex 1202. The processing complex 1202 alerts the controller 1201 of the packet by writing to CSR block 1220. The controller 1201 arbitrates for a dma engine 1224, and dma's a descriptor to the descriptor cache 1222. The controller 1201 uses the descriptor to dma packet "0" from processing complex 1202 to the data path mux 1216. When the packet arrives it is examined to determine its destination MAC address. A lookup into the association logic 1228 is made to determine whether the destination MAC address includes any of the MAC addresses for which the controller 1201 is responsible. If not, then the packet is placed into the transmit fifo 1230 for transfer to the network 1240. Alternatively, if the lookup into the association logic 1228 determines that the destination MAC ADDRESS is one of the addresses for which the controller 1201 is responsible, packet replication logic 1218 causes the packet to be written into the receive fifo 1232 instead of the transmit fifo 1230. In addition, the packet is tagged within the fifo 1232 with the OSD corresponding to the destination MAC address. This causes the controller 1201 to treat this packet as a receive packet, thereby initiating transfer of the packet to it associated processing complex.

In the example illustrated in FIG. 12, packet "0" is a multicast packet, with header information which must be compared to the filters/vlan logic 1218 per OSD to determine whether it should be destined for other OSD's supported by the controller. In this instance, packet "0" is destined for processing complexes 1204, 1206, and a device on the network 1240. Thus, packet "0" is written into the transmit fifo 1230 to be transferred to the network 1240. And, packet "0" is written into the receive fifo 1232 to be transferred to processing complex 1204. Once packet "0" has been transferred to processing complex 1204, packet replication logic 1218, in combination with the filter/vlan logic 1219 determines that the packet is also destined for processing complex 1206. Thus, rather than deleting packet "0" from the receive fifo 1232, packet replication logic 1218 retains the packet in the fifo 1232 and initiates a transfer of the packet to processing complex 1206. Once this transfer is complete, packet "0" is cleared from the fifo 1232. One skilled in the art should appreciate that packet "0" could have been a unicast packet from processing complex 1202 to processing complex 1204 (or 1206). In such instance, packet replication logic 1218 would have determined, using the destination MAC address in packet "0", that the destination OSD was either processing complex 1204 or 1206. In such instance, rather than writing packet "0" into the transmit fifo 1230, it would have written it directly into receive fifo 1232. Processing complex 1204 (or 1206) would have then been notified that a packet had been received for it. In this case, packet "0" would not ever leave the shared controller 1201, and, no double buffering would have been required for packet "0" (i.e., on both the transmit and receive side). One skilled in the art should also appreciate that the statistics recorded for such a loopback packet should accurately reflect the packet transmit from processing complex 1202 and the packet receive to processing complex 1204 (or 1206) even though packet "0" never left the shared controller 1201, or even hit the transmit fifo 1230.

The above example is provided to illustrate that packets transmitted by any one of the supported processing complexes may be destined for one of the other processing complexes connected to the shared controller 1201. If this is the case, it would be inappropriate (at least within an Ethernet network) to present such a packet onto the network 1140, since it will not be returned. Thus, the controller 1201 has been designed to detect, using the destination MAC address, and the association logic 1228, whether any transmit packet is destined for one of the other processing complexes. And, if such is the case, packet replication logic causes the packet to be placed into the receive fifo 1232, to get the packet to the correct processing complex(es).

Figure 13:
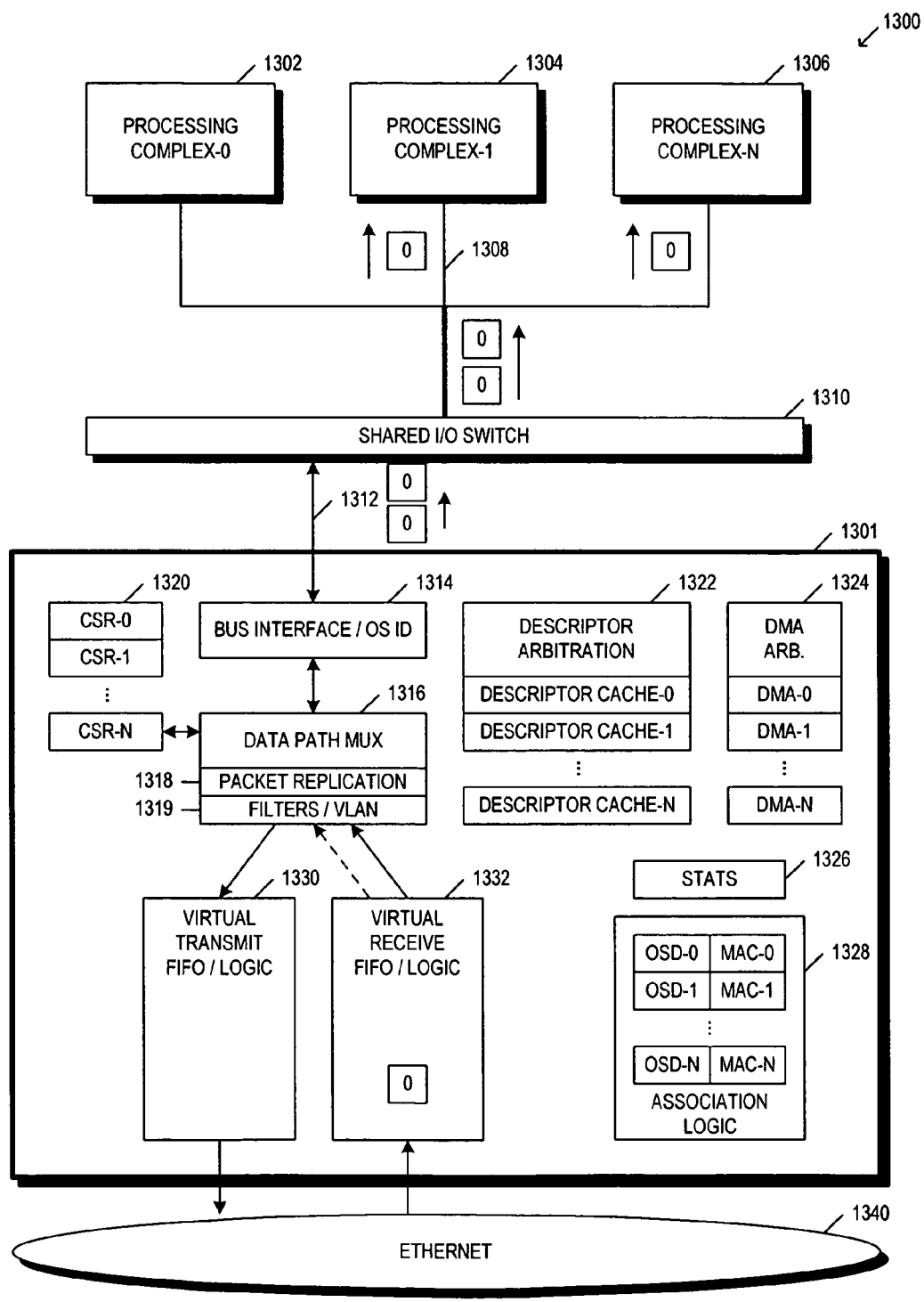
FIG. 13 is a block diagram of illustrating packet flow for a multicast receive operation through the shared network interface controller according to the present invention.

Referring now to FIG. 13, a block diagram 1300 is shown illustrating receipt of a multicast packet from the network 1340. Diagram 1300 is similar to FIGS. 11 and 12, with references the same, the hundreds digits replaced with 13. In this instance, packet "0" is received into the receive fifo 1332. The destination MAC addresse for the packet is read and compared to the entries in the association logic 1328. Further, the packet is determined to be a multicast packet. Thus, filters (perfect and hash) and VLAN tables 1319 are examined to determine which, if any, of the OSD's are part of the multicast. The packet is tagged with OSD's designating the appropriate upstream processing complexes. In this instance, packet "0" is destined for processing complexes 1304, 1306. The controller 1301 therefore causes packet "0" to be transferred to processing complex 1304 as above. Once complete, the controller 1301 causes packet "0" to be transferred to processing complex 1306. Once complete, packet "0" is cleared from receive fifo 1332.

Each of the above packet flows, with respect to FIGS. 11-13, have been simplified by showing no more than three upstream processing complexes, and no more than 3 packets at a time, for which transmit/receive operations must occur. However, as mentioned above, applicant envisions the shared network interface controller of the present invention to support from 1 to N processing complexes, with N being some number greater than 16. The shared I/O switch that has been repeatedly referred to has been described in considerable detail in the parent applications referenced above. Cascading of the shared I/O switch allows for at least 16 upstream processing complexes to be uniquely defined and tracked within the load-store architecture described. It is envisioned that the shared network interface controller can support at least this number of processing complexes, but there is no need to limit such number to 16. Further, the number of packets that may be transmitted/received by the shared network interface controller within a given period of time is limited only by the bandwidth of the load-store link, or the bandwidth of the network connection. As long as resources exist within the shared network interface controller appropriate to each supported processing complex (e.g., descriptor cache, CSR's, etc.), and association logic exists to correlate processing complexes with physical MAC addresses, and data within the controller may be associated with one or more of the processing complexes, the objectives of the present invention have been met, regardless of the number of processing complexes supported, the details of the resources provided, or the physical links provided either to the load-store link, or the network.

Figure 18:
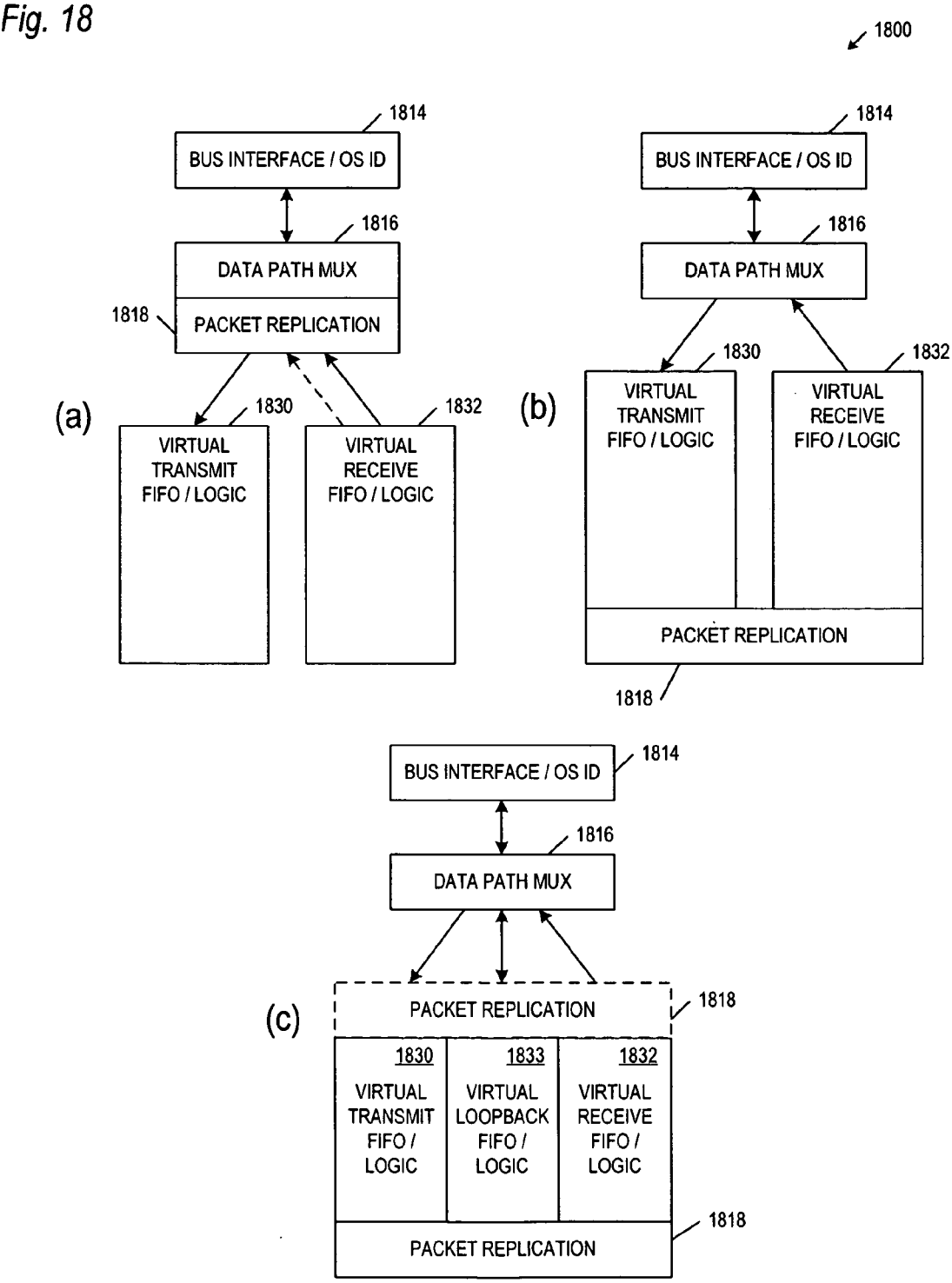
FIG. 18 is a block diagram illustrating alternative embodiments of packet replication logic and loopback detection according to the present invention.

Referring now to FIG. 18, three embodiments of a loopback mechanism 1800 according to the present invention are shown. More specifically, the above discussion with reference to FIGS. 12 and 13 illustrated a feature of the present invention which prevents packets originating from one of the OSD's supported by the shared controller 600 and destinated for another one of the OSD's supported by the shared controller 600, from entering the network. This feature is termed "loopback". In operation, the shared controller 600 detects, for any packet transmitted from an OSD, whether the packet is destined for another one of the OSD's supported by the controller. As described with reference to FIG. 12, packet replication logic 1218 makes this determination, by comparing the destination MAC address in the packet with its corresponding OSD provided by the association logic 1228. This is merely one embodiment of accomplishing the purpose of preventing a packet destined for another one of the OSD's from entering the network. Other embodiments are envisioned by the inventor. For example, in embodiment (a) shown in FIG. 18, packet replication logic 1818 is located between the bus interface 1814 and the transmit receive fifo's 1830 and 1832. However, in this embodiment, a modification in the controller's driver (loaded by each OSD) requires that the driver specify the destination MAC address for a packet within the transmit descriptor. Thus, when a transmit descriptor is downloaded into the controller 600, the packet replication logic 1818 can examine the descriptor to determine whether the packet will require loopback, prior to downloading the packet. If this is determined, the location for the loopback packet, whether in the transmit fifo, or the receive fifo, is made prior to transfer, and indicated to the appropriate DMA engine.

In an alternative embodiment (b), the replication logic 1818 is placed between the transmit/receive fifo's 1830, 1832 and the transmit/receive logic. Thus, a loopback packet is allowed to be transferred from an OSD into the transmit fifo 1830. Once it is in the transmit fifo 1830, a determination is made that its destination MAC address corresponds to one of the OSD's supported by the controller. Thus, packet replication logic 1818 causes the packet to be transferred into the receive fifo 1832 for later transfer to the destination OSD.

In yet another embodiment (c), the replication logic 1818 is placed either between the fifo's and the transmit/receive logic, or between the bus interface 1814 and the fifo's 1830, 1832. In either case, a loopback fifo 1833 is provided as a separate buffer for loopback packets. The loopback fifo 1833 can be used to store loopback packets, regardless of when the loopback condition is determined (i.e., before transfer from the OSD; or after transfer into the transmit fifo 1830).

What should be appreciated from the above discussion is that a number of implementations exist to detect whether a transmit packet from one OSD has as its destination any of the other OSD's supported by the shared controller. As long as the controller detects such an event (a "loopback"), and forwards the packet to the appropriate destination OSD(s), the shared controller has efficiently, and effectively communicated the packet accurately.

Figure 14:
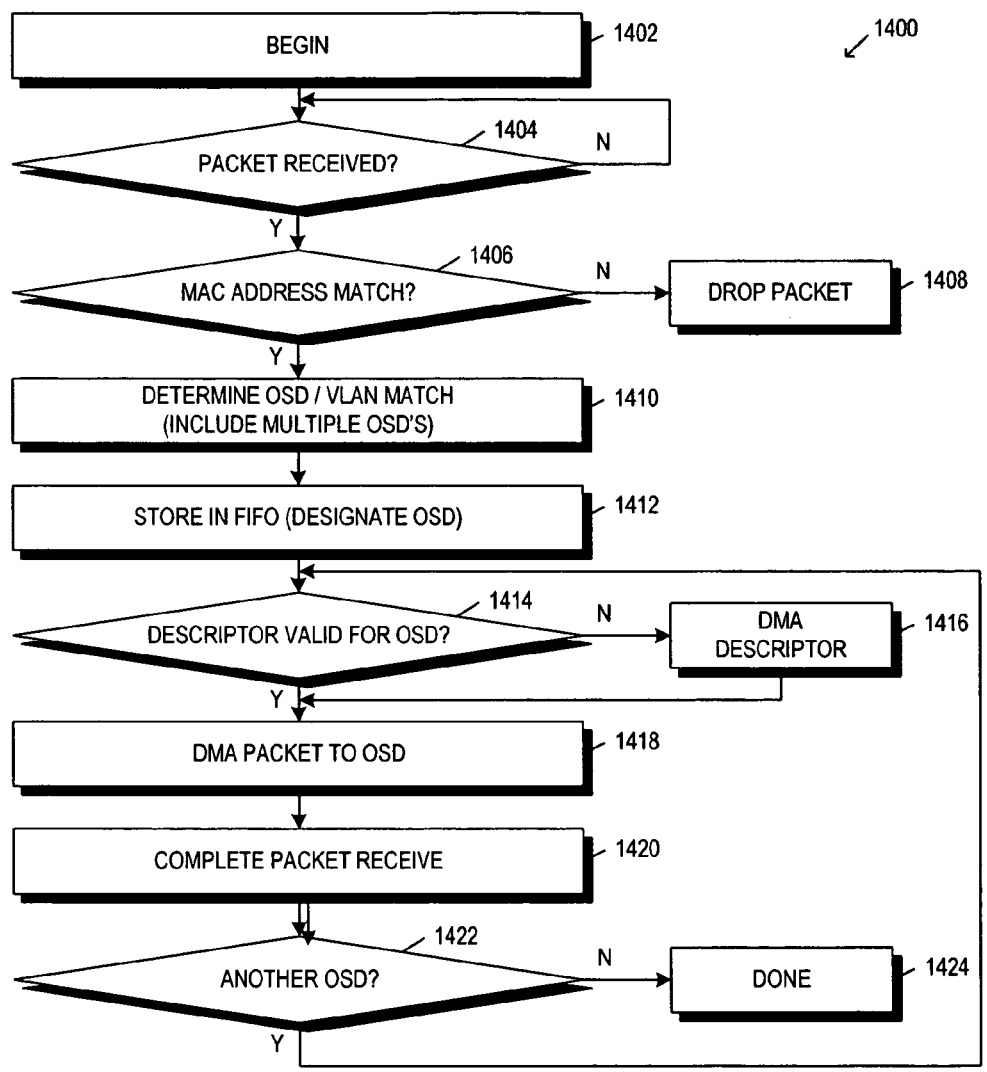
FIG. 14 is a flow chart illustrating a packet receive through the shared network interface controller of the present invention.

Referring now to FIG. 14, a flow chart 1400 is shown illustrating the method of the present invention when a packet is received by the network interface controller. Flow begins at block 1402 and proceeds to decision block 1404.

At decision block 1404, a determination is made as to whether a packet has been received. If not, flow proceeds back to decision block 1404. If a packet has been received, flow proceeds to decision block 1406. In an alternative embodiment, a determination is made as to whether the header portion of a packet has been received. That is, once the header portion of a packet is received, it is possible to associate the destination MAC address with one (or more) OSD's, without waiting for the packet to be completely received.

At decision block 1406, a determination is made as to whether the destination MAC address of the packet matches any of the MAC addresses for which the controller is responsible. If not, flow proceeds to block 1408 where the packet is dropped. However, if a match exists, flow proceeds to block 1410.

At block 1410, association logic is consulted to determine which OSD's correspond to the destination MAC addresses referenced in the received packet. A further determination is made as to whether the MAC addresses correspond to particular virtual lans (VLAN's) for a particular OSD. Flow then proceeds to block 1412.

At block 1412, the packet is stored in the receive fifo, and designating with its appropriate OSD(s). Flow then proceeds to decision block 1414.

At decision block 1414, a determination is made as to whether the controller contains a valid receive descriptor for the designated OSD. If not, flow proceeds to block 1416 where the controller retrieves a valid receive descriptor from the designated OSD, and returns flow to block 1418. If the controller already has a valid receive descriptor for the designated OSD, flow proceeds to block 1418.

At block 1418, the packet begins transfer to the designated OSD (via the shared I/O switch). Flow then proceeds to block 1420.

At block 1420, packet transfer is completed. Flow then proceeds to decision block 1422.

At decision block 1422, a determination is made as to whether the packet is destined for another OSD. If not, flow proceeds to block 1424 where the method completes. But, if the packet is destined for another OSD, flow returns to decision block 1414 for that designated OSD. This flow continues for all designated OSD's.

Figure 15:
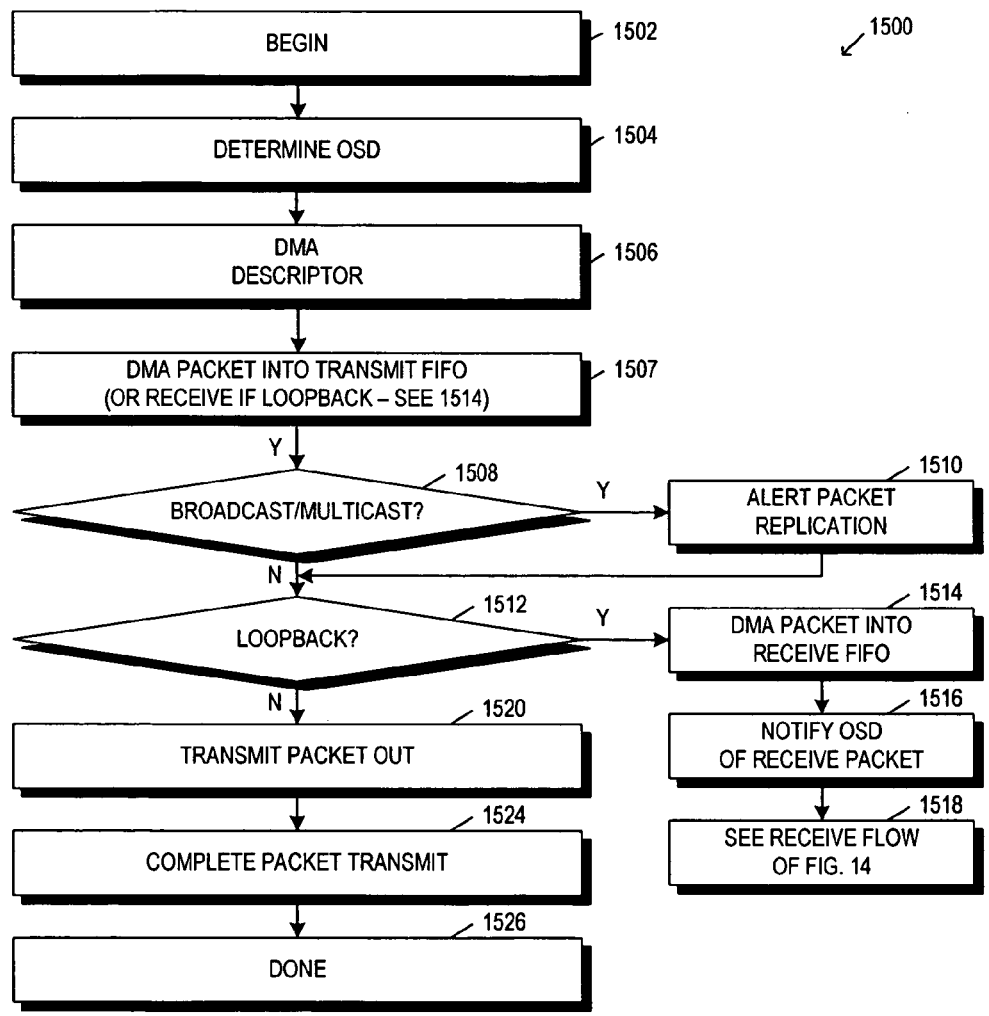
FIG. 15 is a flow chart illustrating a packet transmit through the shared network interface controller of the present invention.

Referring now to FIG. 15, a flow chart 1500 is shown illustrating the method of the present invention for transmit of a packet through the shared network interface controller of the present invention.

Flow begins at block 1502 and proceeds to block 1504.

At block 1504, a determination is made as to which OSD is transmitting the packet. Flow then proceeds to block 1506.

At block 1506, a valid transmit descriptor for the transmit OSD is obtained from the OSD. Flow then proceeds to block 1507.

At block 1507, the packet is dma'ed into the transmit fifo. Flow then proceeds to decision block 1508. Note, as discussed above, in one embodiment, the OSD places the destination MAC address within the descriptor to allow the packet replication logic to determine whether a loopback condition exists, prior to transferring the packet into the transmit fifo. In an alternative embodiment, the OSD does not do the copy, so the shared controller does not associate a packet with loopback until the first part of the header has been read from the OSD. In either case, the loopback condition is determined prior to block 1520. If the destination MAC address (and/or an indication of broadcast or multicast) is sent with the descriptor, the packet replication logic can determine whether a loopback condition exists, and can therefore steer the dma engine to transfer the packet directly into the receive fifo. Alternatively, if the descriptor does not contain the destination MAC address (for loopback determination), then a determination of loopback cannot be made until the packet header comes into the controller. In this instance, the packet header could be examined while in the bus interface, to alert the packet replication logic whether to steer the packet into the transmit fifo, or into the receive fifo. Alternatively, the packet could simply be stored into the transmit fifo, and await for packet replication logic to determine whether a loopback condition exists.

At decision block 1508 a determination is made as to whether the transmit packet is either a broadcast or a multicast packet. If the packet is either a broadcast or multicast packet, flow proceeds to block 1510 where packet replication is notified. In one embodiment, packet replication is responsible for managing packet transfer to multiple MAC addresses by tagging the packet with information corresponding to each destination OSD, and for insuring that the packet is transmitted to each destination OSD. While not shown, one implementation utilizes a bit-wise OSD tag (i.e., one bit per supported OSD), such that an eight bit tag could reference eight possible OSD destinations for a packet. Of course, any manner of designating OSD destinations for a packet may be used without departing from the scope of the present invention. Once the tagging of the packet for destination OSD's is performed, flow proceeds to decision block 1512.

At decision block 1512, a determination is made as to whether the transmit packet is a loopback packet. As mentioned above, on an Ethernet network, a network interface controller may not transmit a packet which is ultimately destined for one of the devices it supports. In non shared controllers, this is never the case (unless an OSD is trying to transmit packets to itself). But, in a shared controller, it is likely that for server to server communications, a transfer packet is presented to the controller for a destination MAC address that is within the realm of responsibility of the controller. This is called a loopback packet. Thus, the controller examines the destination MAC address of the packet to determine whether the destination is for one of the OSD's for which the controller is responsible. If not, flow proceeds to block 1520. However, if the packet is a loopback packet, flow proceeds to block 1514.

At block 1514, the packet is transferred to the receive fifo rather than the transmit fifo. Flow then proceeds to block 1516.

At block 1516, the destination OSD is notified that a packet has been received for it. In one embodiment this requires CSR's for the destination OSD to be updated. Flow then proceeds to block 1518.

At block 1518, flow proceeds to the flow chart of FIG. 14 where flow of a receive packet was described.

At block 1520, the packet is transferred to the transmit fifo. Flow then proceeds to block 1522.

At block 1522, the packet is transmitted out to the network. Flow then proceeds to block 1524.

At block 1524, packet transmit is completed. Flow then proceeds to block 1526 where the method completes.

Figure 16:
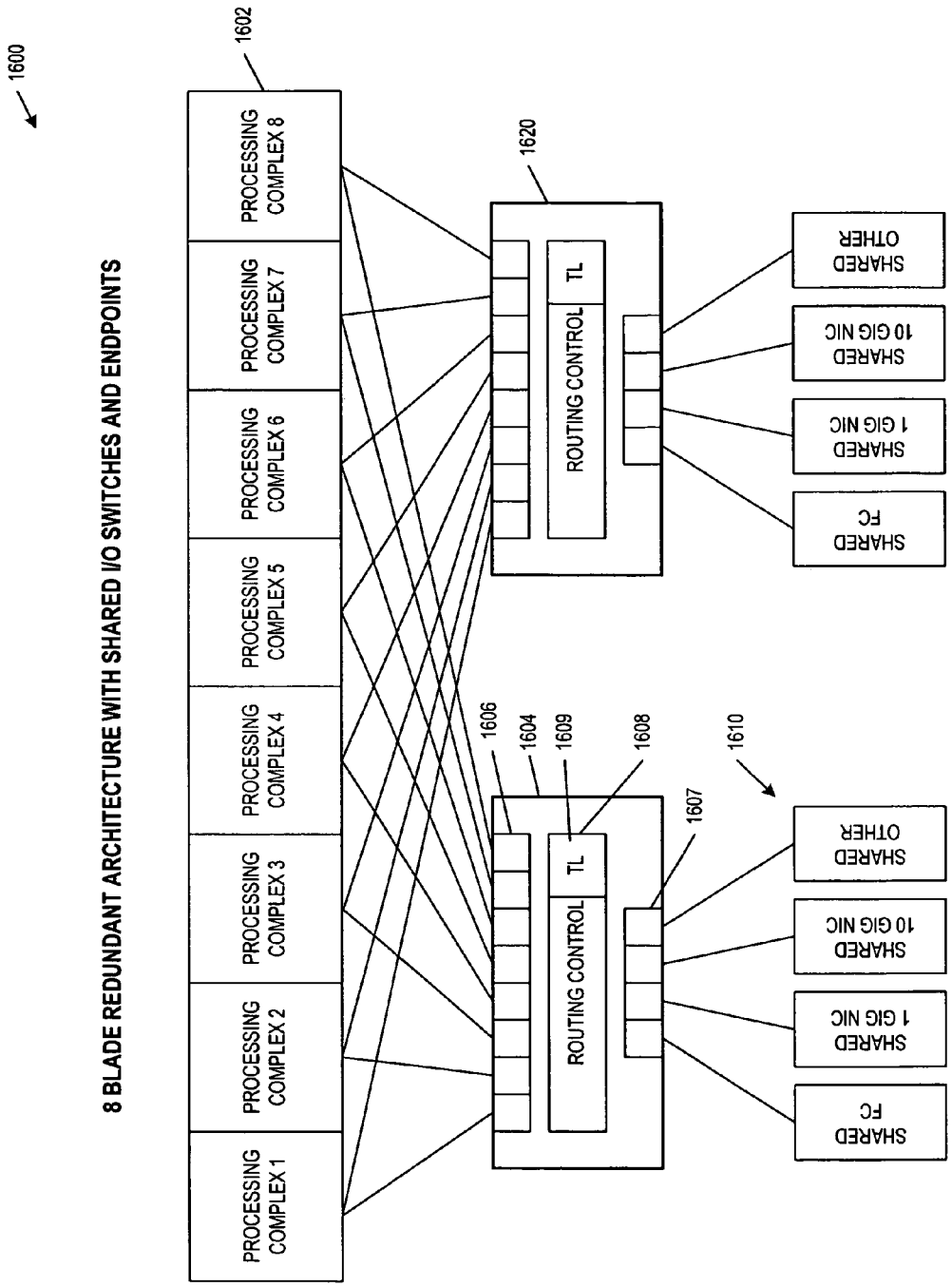
FIG. 16 is a block diagram of a redundant 8 blade server architecture utilizing shared I/O switches and endpoints according to the present invention.

Referring now to FIG. 16, a block diagram 1600 is shown which illustrates eight processing complexes 1602 which share four shared I/O controllers 1610 utilizing the features of the present invention. In one embodiment, the eight processing complexes 1602 are coupled directly to eight upstream ports 1606 on shared I/O switch 1604. The shared I/O switch 1604 is also coupled to the shared I/O controllers 1610 via four downstream ports 1607. In one embodiment, the upstream ports 1606 are PCI Express ports, and the downstream ports 1607 are PCI Express+ports, although other embodiments might utilize PCI Express+ports for every port within the switch 1604. Routing Control logic 1608, along with table lookup 1609 is provided within the shared I/O switch 1604 to determine which ports packets should be transferred to.

Also shown in FIG. 16 is a second shared I/O switch 1620 which is identical to that of shared I/O switch 1604. Shared I/O switch 1620 is also coupled to each of the processing complexes 1602 to provide redundancy of I/O for the processing complexes 1602. That is, if a shared I/O controller 1610 coupled to the shared I/O switch 1604 goes down, the shared I/O switch 1620 can continue to service the processing complexes 1602 using the shared I/O controllers that are attached to it. One skilled in the art will appreciate that among the shared I/O controllers 1610 shown are a shared network interface controller according to the present invention.

Architecture for Reset

As will be appreciated by one skilled in the art, resets are necessary within electronic systems, to initialize hardware logic, configuration registers, port states, and state machines, as well as to recover from hangs, faults, etc. The below discussion will describe the reset mechanisms provided by the present invention for providing reset within a shared network controller.

Figure 19:
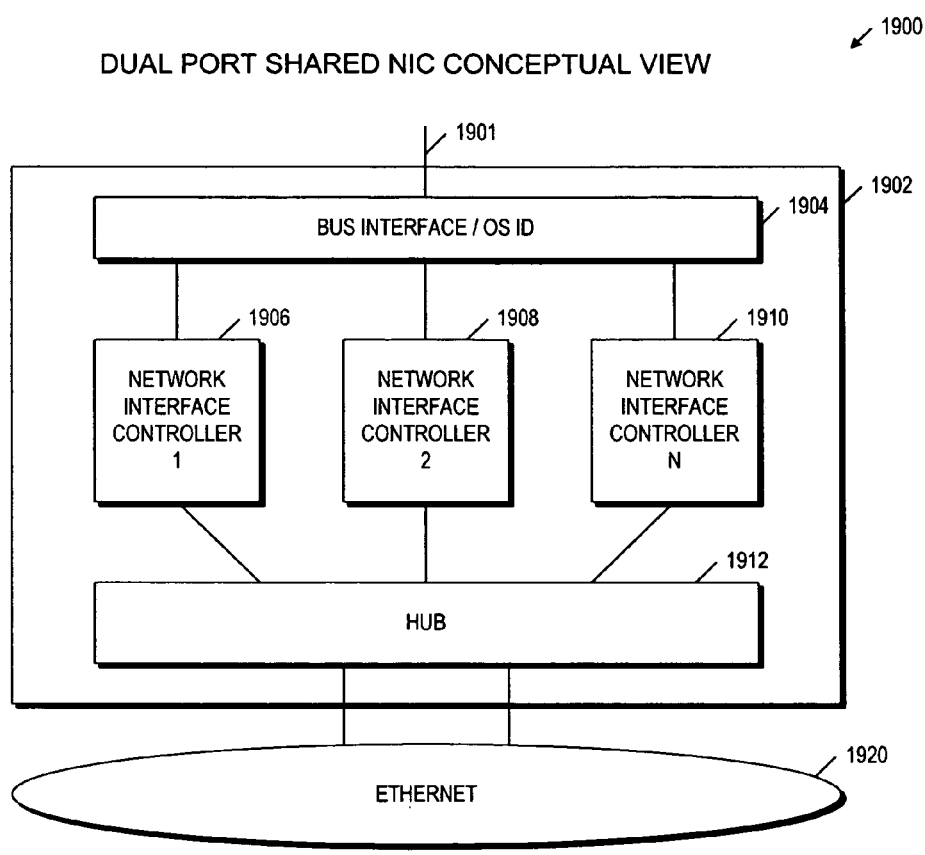
FIG. 19 is a block diagram of a conceptual view of the shared NIC according to the present invention.

Referring now to FIG. 19, a block diagram 1900 is shown of a conceptual view of a shared network interface controller 1902 according to the present invention. What is particularly illustrated is a shared NIC 1902 coupled between an Ethernet network 1920, and a PCI Express+bus 1901 as described above. As in the NIC described above with respect to FIG. 6, the NIC 1902 contains bus interface/OS ID logic 1904, for interfacing the shared NIC 1902 to a PCI Express+bus. The NIC 1902 contains two Ethernet ports (e.g., 10/100 MB/s and 1 Gig/s) for connecting the NIC 1902 to the Ethernet network. And, while what has been described above is a single NIC that is shared by multiple OSD's or processing complexes, from a conceptual standpoint, or from the standpoint of the OSD's, they each are coupled to their own NIC. Thus, conceptually what is provided are 1-n NICS 1906, 1908, 1910 (at least one for each supported OSD), coupled between the bus interface 1904, and a hub 1912. What should be appreciated from FIG. 19 is that for each OSD supported by the NIC 1902, at least one NIC appears to be mapped to it, with a hub 1912 for coupling the NIC's 1906, 1908, 1910 to the ports on the shared NIC 1902.

With the conceptual view of the shared NIC 1902 in mind, the applicant has provided three reset domains for the shared NIC 1902. These domains are: PCI-Express, OSD, and global. In one embodiment, a reset of PCI-Express (or PCI-Express+) would be a reset of the physical link between the shared NIC 1902 and the shared I/O switch (such as the switch 314 of FIG. 3). A reset of the OSD would be a reset of the conceptual NIC associated with a particular OSD. And, a global reset would essentially be a reset of the conceptual hub. Alternatively, a global reset could be a rest of the entire shared adapter. Thus, there are at least three functional areas of reset, with at least three possible sources of reset including: the PCI-EX+ link, for link retraining (considered a global reset); an OS initiated reset utilizing PCI-Express Reset DLLP; and a Driver initiated reset (where an OSD specific driver writes to the CSR of its NIC). Some of the sources can reset some of the functional areas, but not all of them. For example, a link reset for a particular conceptual NIC may not be a global event. However, if such a reset fails after several attempts, then you may have to reset the physical link which will have a global impact across all OSD's. To provide for these functional areas of reset, applicants have created logic within the shared NIC of the present invention, which will be further described below with respect to FIG. 20.

Figure 20:
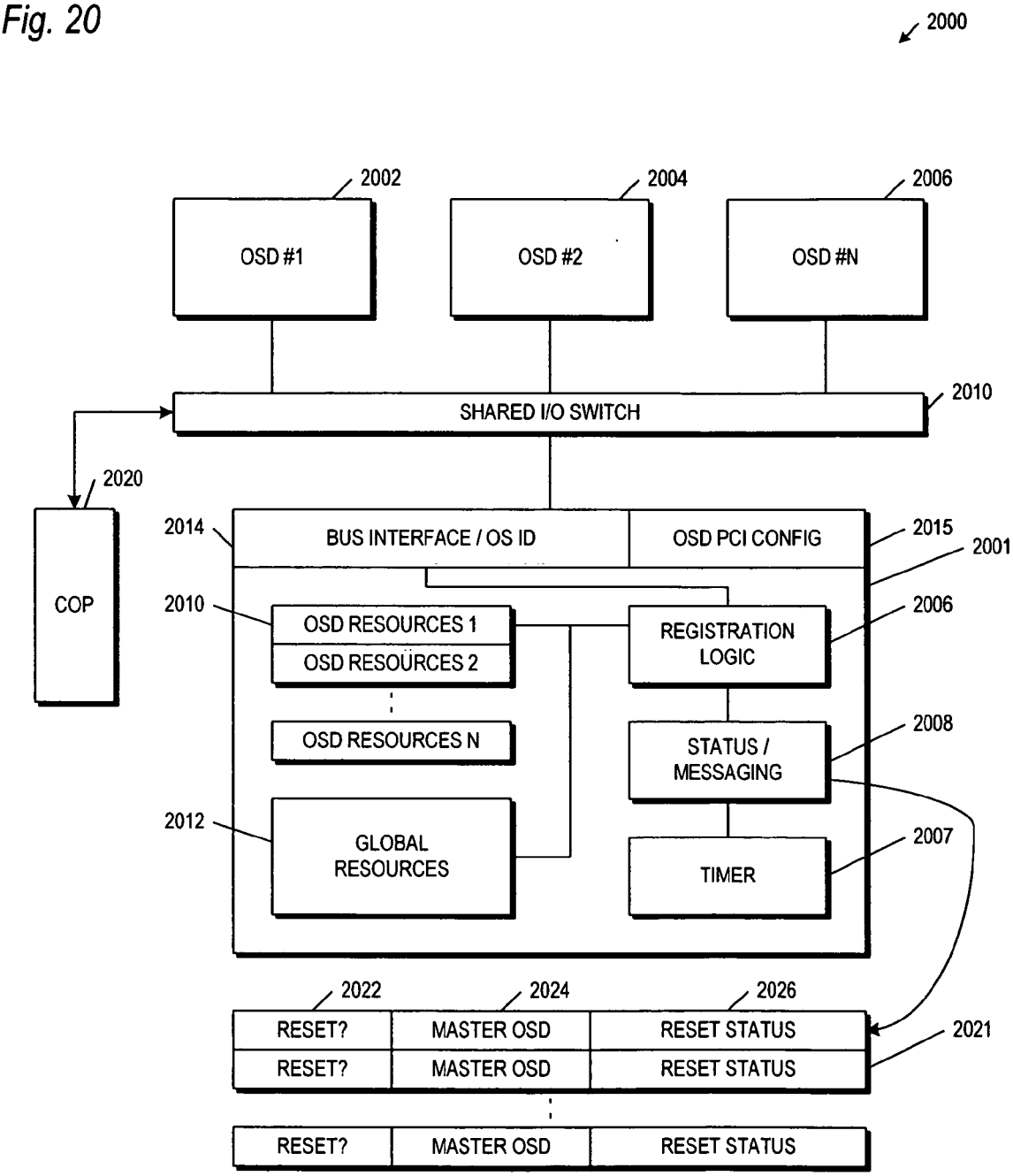
FIG. 20 is a block diagram of a portion of the reset logic within the shared NIC according to the present invention.

Referring now to FIG. 20, a block diagram 2000 of a portion 2001 of the shared NIC described above with respect to FIG. 6 is shown, coupled to the environment described with respect to FIG. 11. The portion 2001 includes bus interface/OS ID logic 2014 coupled to a shared I/O switch 2010. As mentioned above, the bus interface/OS ID logic 2014 receives packets from the shared I/O switch 2010, and determines which of the OSD's 2002, 2004, 2006 are associated with the information. Further, the bus interface/OS ID logic 2014 is responsible for embedding OSD information into packets destined for one of the upstream OSD's 2002, 2004, 2006. The Bus Interface/OS ID logic 2014 is coupled to OSD PCI Config logic 2015. The OSD PCI Config logic 2015 stores the address mapping for each of the OSD's 2002, 2004, 2006 for communication with the shared controller 2001. That is, the address range within the memory map of each of the OSD's is established, and stored within the OSD PCI Config logic 2015 upon initialization of each of the OSD's 2002, 2004, 2006.

The controller 2001 further includes a plurality of local OSD resources 2010. Such resources 2010 include control status registers (CSR's), DMA engines, Task Files, and any other resources that are particular to an individual OSD, such as those described in detail above. The controller 2001 further includes global resources 2012. Such global resources 2012 include global CSR's, (if not duplicated for each OSD), global statistics, and any other resources that are shared by all OSD's. The areas effected by reset, within the controller 2001, include the OSD resources 2010 (for a driver or OS initiated reset), the global resources 2012 for a global reset, and the OSD PCI Config logic 2015, for a reset of the PCI Express+ link. Within a prior art non-shared network interface controller, all of these resources or logic are treated as one, and are reset in total, either by an OS initiated reset, a driver initiated reset, or a link reset. However, the applicant has recognized that within the shared network interface controller 2001 of the present invention, such "global" resets by a driver or an OS would have catastrophic effects since the controller 2001 is responsible for supporting multiple OSD's 2002-2006. Therefore, applicant has provided additional logic, described below, to allow driver and OS initiated resets which reset only those local resources 2010 particular to the initiating OSD, while preserving intact the global resources 2012, and OSD PCI Config logic 2015 unique to other OSD's.

Global Reset

As mentioned above, there are at least three sources of reset for the shared NIC of the present invention. The first and primary source of reset is the shared I/O switch described above, and in the other applications incorporated by reference. At time zero such as upon power up, upon a hot-plug event, or if the link needs to be retrained due to unrecoverable link errors, the PCI-Express (or PCI-Express+) link must be trained. This is considered link level training. Link level training for the shared NIC of the present invention operates similarly to that of non-shared I/O endpoint devices and is described in the specification to PCI-Express. But, within the shared controller environment of the present invention, a link retrain of the link between the shared I/O switch 2010 and the controller 2001 is initiated by the switch 2010 either on its own, or on behalf of a "master" OSD. And, in an additional embodiment, a coprocessor 2020 is provided which is coupled to the shared I/O switch 2010 (or even embedded within the shared I/O switch 2010) which can act as a "master" for reset purposes, as further described below. For example, the coprocessor 2010 can, prior to link re-training by the switch 2010, read the contents of the OSD PCI Config logic 2015 so that the mapping tables to each of the OSD's 2002-2006 are preserved, and can be restored before the virtual portions (e.g., the local resources 2010) for each of the OSD's 2002-2006 are reset. Further TLP status can be maintained, either by the shared I/O switch, or by the COP 2020 as described above, so that link retraining of the shared controller 2001 looks like a stall to the individual OSD's 2002-2006, rather than a reset. Thus, reads and writes can be held by the OSD's 2002-2006 until re-initialization. Further, when errors occur that are not recoverable, and a link retrain occurs, the shared I/O switch 2010 causes the retrain to look, from the perspective of the OSD's 2002-2006, as a hot plug surprise removal. This causes each of the OSD's to initiate a reset DLLP that will then be executed by the controller 2001 upon completion of the link retrain, and upon mapping of the OSD 2002, 2004, 2006 to the controller 2001 by the shared I/O switch 2001. Details of how the mapping is performed are described in the parent applications.

More specifically, although each OSD which is supported by the shared NIC will believe, from a conceptual standpoint, that it has its own NIC, at any given time only one of the supported OSD's can truly be recognized as a "master", with respect to master management issues such as global initialization, reset, re-flashing firmware, etc. Therefore a mechanism is provided within the portion 2001 to allow an OSD 2002-2006 (or the COP 2020) to "register" itself with the shared NIC as the management master, and perform such master management functions as buffer allocation (TX/RX buffers), memory allocation per OSD, reflashing of the EEPROM, rebooting from the firmware, resetting of the physical speed on the Ethernet ports, partitioning of resources, etc. Further, to allow existing drivers to work with the shared NIC of the present invention, the shared NIC could recognize driver initiated resets, and configuration requests, and would indicate to the driver that the requests had been taken, even though access to global resources is prevented. Then, when a "master" OSD took control of the shared NIC, the shared NIC could provide it with information related to the legacy reset so it could determine whether more action is needed.

In conjunction with the other elements shown in FIG. 20, logic that is responsible for granting an OSD (or the COP 2020) "global reset" access to the shared NIC of the present invention includes registration logic 2006. As mentioned above, non shared network interface controllers are reset in their entirety when their associated OSD initiates reset. That is, there are not different classes of reset effecting different parts within a non shared NIC. And, since a non-shared NIC is responsible for servicing only one OSD, that OSD is by definition a master. However, in the shared NIC of the present invention, any reset of global resources 2012, or OSD configuration particular to another OSD 2015 would impact other OSD's. Therefore, there is a need to qualify such global resets by requiring the requesting OSD to first register to become a reset master. Such registration is envisioned as a request by the driver of an OSD to the shared NIC 2001 in a form that qualifies the requesting OSD to perform a global reset. The qualification of a requesting OSD is performed by the registration logic 2006.

In one embodiment, the registration logic 2006 is simply a control status register that can be written to by the driver of a requesting OSD. That is, the registration logic 2006 allows any requesting OSD to become a master, but only one at a time. So, if a requesting OSD successfully writes to the registration logic, it becomes a master, and then has the capability of performing some or all of the global reset functions described above. If another requesting OSD attempts to write to the registration logic 2006 while another requesting OSD is performing a reset, the registration logic 2006 will prevent the write from occurring, thus insuring that only one master at a time can perform global reset. This is considered a de-centralized approach to performing global reset of the shared NIC 2001 since any of the OSD's have the potential to become a reset master.

In an alternative embodiment, a stricter, centralized approach to registration is required. In this embodiment, the registration logic 2006 requires a key, or password, to be successfully entered by a requesting master before it allows a global reset. The key can be established in firmware, or can be set by the shared I/O switch 2010 (or the COP 2020) at time of initialization of the shared NIC 2001. Then, if a requesting OSD correctly writes the key to the registration logic 2006, the registration logic 2006 will grant the requesting OSD access to perform global reset. But, if the requesting OSD writes an incorrect key, its request for global reset is denied. One skilled in the art will appreciate that a number of alternative embodiments exist to allow one or more of the OSD's 2002-2006 (or the COP 2020) to become a reset master of the shared NIC 2001. Applicant believes that it is the act of registration to become reset master of a shared NIC 2001 that is novel, rather than particular circuitry or methodology associated with the act of registration. Any circuitry and or software that allows one or more requesting OSD's 2002-2006 to register for purposes of global reset is encompassed within the registration logic 2006. Applicant further believes that novelty lies in allowing a driver to initiate registering itself as a master, as well as in the shared NIC differentiating between multiple drivers, for purposes of establishing a reset master.

Further, Applicant has recognized that since reset need not necessarily be entirely global, the registration logic 2006 has been designed to allow the master OSD to communicate to the shared NIC 2001 what portions of the shared NIC 2001 are to be reset. For example, the master OSD may simply wish to change the physical connection speed of the Ethernet port from 10 Mb/s to 100 Mb/s. This does not require rebooting of the firmware, or repartitioning of the global resources 2012. In one embodiment, a control status register (not shown) within the registration logic 2006 is provided to receive a write from the master OSD indicating what portions of the shared NIC 2001 are to be reset. The registration logic 2006 then utilizes the contents of this register to reset only those portions of the shared NIC indicated to be reset by the master OSD. Further, the same, or an additional control status register (not shown) is provided to allow the master OSD to designate which initialization (or reset) activities are to be performed by the shared NIC, as well as what parameters are to be effected by the activities. One skilled in the art will appreciate that a number of mechanisms may be used to allow a master OSD to indicate which of the resources within the shared NIC 2001 are to be reset.

Since the act of registering to become a reset master has an impact on other OSD's, it is considered appropriate to provide status/messaging logic 2008 to attempt to alert the other impacted OSD's of the impending reset. Once the registration logic 2006 grants an OSD master status, it attempts to interrupt the other non-master OSD's to indicate that a global reset will soon begin. In one embodiment, this is performed by having the registration logic 2006 write to bits within the status/messaging logic 2008 which are viewable by the other OSD's. That is, the status/messaging logic 2008 is as simple as a set of status registers 2021 which are within the load/store memory map of each of the OSD's. The status registers 2021 contain a reset bit 2022 to indicate that a global reset is underway, and that the OSD's should discontinue reads/writes to the shared NIC 2006. Further, the status registers 2021 include master indicator bits 2024 to indicate which of the OSD's is the reset master. And, the status registers 2021 include reset status bits 2026 which are updated during reset to provide a status of global reset to the other OSD's. In this embodiment, the registration logic 2006 updates the status/messaging logic 2008 when a reset master is established, and updates the status/messaging logic 2008 during reset so that at any time, a non master OSD can determine the status of reset. Once the function of global reset is completed, the status/messaging logic 2008 is updated to reflect the completion, so that each of the non master OSD's can perform a local reset, initiated by a DLLP transaction, or CSR, or other mechanism.

In one embodiment, the OSD PCI Config logic 2015 is preserved during global reset so that the non master OSD's can continue to communicated with the shared NIC 2001, and read the status/messaging logic 2008 to detect the status of the global reset. Applicant envisions the possibility that a problem might occur with the master OSD during global reset which could impact the other OSD's if the reset does not complete. Therefore, Applicant has provided Timer logic 2007 coupled to the registration logic 2006 and to the status/messaging logic 2008. The purpose of the timer logic 2007 is to time each stage in the process of global reset. If a stage during global reset completes within an appropriate period of time, the timer logic 2007 is reset to begin timing for the next stage. However, if the timer logic 2007 ever times out during a stage of reset, it causes the registration logic 2006 to remove the reset master as the master, thereby allowing another OSD to register as master and continue the reset, or restart the reset. Further, the timer logic 2007 is coupled to the status/messaging logic 2008 to allow it to update the status/messaging logic 2008 of the last stage completed in the reset process. Further, the timer logic 2007 can communicate to the status/messaging logic 2008 that a reset failed. This allows each of the other OSD's, to determine from the status/messaging logic 2008, if a reset completes successfully, if a reset is completing successfully, what stage of reset the shared NIC 2001 is in, and if a reset fails, that it did fail, and what stage of reset the shared NIC 2001 was in when it failed. One skilled in the art will appreciate that the timer logic 2007 could have a predefined set of timers for each stage of reset, or alternatively, could be programmed by the reset master, either at the beginning of reset, or at each stage in reset, to insure that a timeout occurs if the reset master fails during reset.

Figure 21:
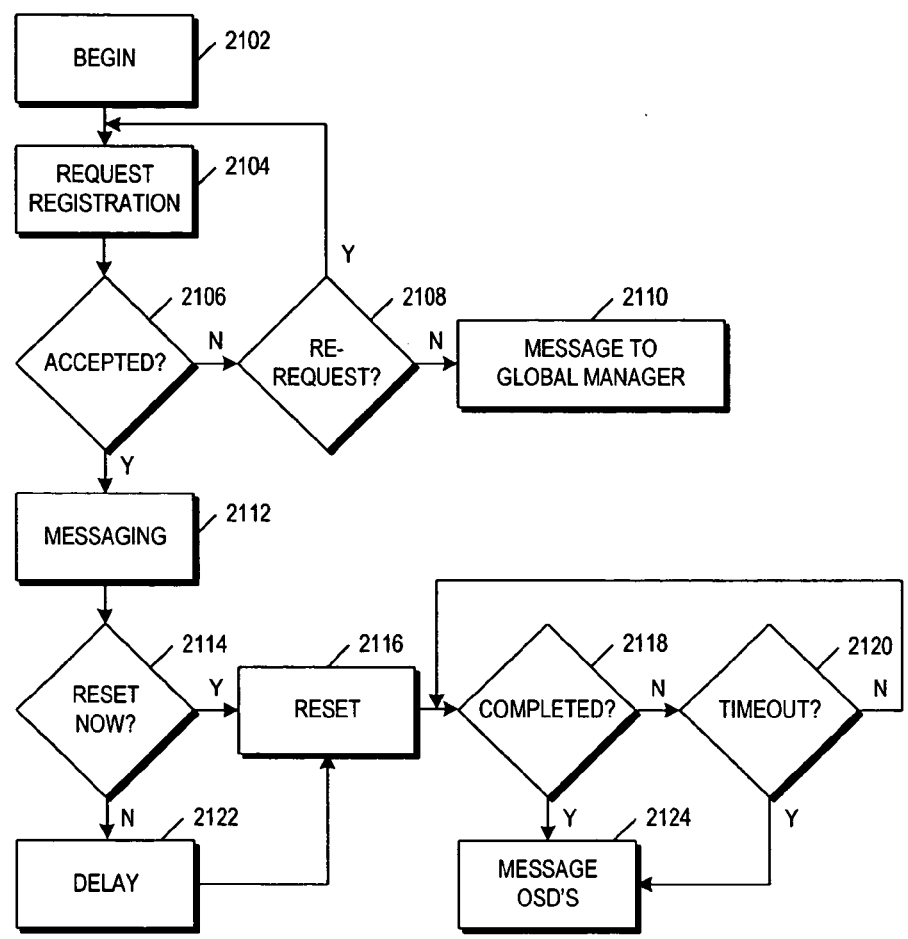
FIG. 21 is a flow chart illustrating a method of registering an operating system domain as a reset master.

Referring now to FIG. 21, a flow chart 2100 is shown to illustrate one embodiment of the registration process described above. Applicant believes that the need for an OSD to request registration to become a global manager has heretofore not existed because there has previously been a one-to-one correspondence between an OSD and a NIC. But, with the invention of the shared NIC as described in the parent application, registration of an OSD as a global manager becomes desirable. Applicant has described an apparatus with respect to FIG. 20 to allow for such registration. A method of registration is now illustrated with respect to FIG. 21, to which attention is now directed.

Flow begins at block 2102 and proceeds to block 2104.

At block 2104, a driver of an OSD requests registration to become a global manager. Flow then proceeds to decision block 2106.

At decision block 2106, a determination is made as to whether the request for registration is accepted by the registration logic. That is, a determination is made as to whether another master has already been granted, or whether the current requesting master has authority to request status as global master. If not, flow proceeds to decision block 2108. Otherwise, flow proceeds to block 2112.

At decision block 2108, a determination is made as to whether the requesting master wishes to re-request mastership. In one embodiment, this could be the case if the reason for not accepting registration is because another OSD is currently the global master. In this instance, the requesting master might wish to allow the current master to complete reset. Or, the requesting master might wish to read the status/messaging logic to determine the status of reset. But, whatever the reason for not accepting the request, the requesting OSD can make a determination as to whether it wishes to re-request registration. If it does, then flow proceeds back to block 2104. If it does not wish to re-request registration, flow proceeds to block 2110 where it is given the opportunity to send a message to the current master OSD. In one embodiment, this can be performed utilizing the status/messaging logic. In an alternative embodiment, this can be performed outside the mechanisms within the shared NIC.

At block 2112, the registered master OSD, either via its driver, or via the registration logic 2006, provides an indication (e.g., an interrupt) to each of the other OSD's that a reset will occur. As mentioned above, this can be accomplished by setting particular bits within the status/messaging logic 2008. This gives the other OSD's an opportunity to halt activity to/from the shared NIC before the reset occurs. Flow then proceeds to decision block 2114.

At decision block 2114 a determination is made as to whether a reset should occur immediately. That is, the registered OSD may allow a predetermined amount of time to pass before initiating reset to allow the other OSD's to detect the reset condition. If a reset is to occur immediately, flow proceeds to block 2116. If the reset is to be delayed, flow proceeds to block 2122.

At block 2122, a delay of a predetermined amount is provided. Flow then proceeds to block 2116. Block 2122 could also provide a delay to allow other OSD's to set status bits back before proceeding to reset.

At block 2116, a reset occurs as specified by the registered OSD. In one embodiment, the contents of the OSD PCI Config logic are provided either to the registered OSD, or to the shared I/O switch, so that the other OSD's can re-establish a link to the shared NIC, after reset, without requiring re-initialization. Then, whatever portion of the shared NIC specified by the registered OSD for reset, is reset. Flow then proceeds to decision block 2118.

At decision block 2118, a determination is made as to whether reset has completed. If so, flow proceeds to block 2124. However, if reset has not completed, flow proceeds to decision block 2120.

At decision block 2120, a determination is made as to whether the timer logic timed out during one of the stages of reset. If so, flow proceeds to block 2124. However, if a timeout has not occurred, flow proceeds back to decision block 2118.

At block 2124, the status/messaging logic is updated, either to indicate to the other OSD's that the reset has completed (from decision block 2118), or to indicate to the other OSD's that reset has failed, and what stage of reset failed.

The above flow chart illustrating registration of an OSD (whether one of the OSD's 2002, 2004, 2006, or the COP 2020) is merely one embodiment of the novel invention of requiring an OSD to register itself with the shared NIC prior to performing a reset. One skilled in the art will appreciate that other methods and/or apparatus may be used without departing from the scope of the present invention.

OSD Initiated Reset

With the above understanding that to reset the entire shared NIC 2001 (or any of the global resources 2012 of the shared NIC 2001), an OSD must register to become a reset master, additional reset capabilities are provided which are not global. That is, capability is given to each OSD to reset its "virtual" NIC (as described above with respect to FIG. 19). Applicant considers the differentiation between global and local resources, for purposes of reset, to be another novel aspect of the present invention. More specifically, while resetting of global resources is designed to be performed after registration, "virtual" resets from individual OSD's can be accomplished within the shared NIC without registration, since the "virtual" resets only affect resources particular to the requesting OSD.

More specifically, when an OSD wishes to perform a hardware reset to its virtual NIC, a reset DLLP packet is transmitted from the shared I/O switch to the shared NIC. The bus interface/OS ID detects which OSD is requesting the reset. And, rather than resetting the PCI-Express (or PCI-Express+) link, performs a reset of the OSD Resources 2010 which are associated with the detected OSD. This reset includes any of the CSR's, DMA engines, task files, etc., that are local to the requesting OSD. It does not include the global resources 2012, or the local resources 2010 associated with other OSD's. Further, it resets the OSD PCI Config logic 2015 that is particular to the requesting OSD (which includes the PCI configuration space and PCI-Express items specific to that OSD), while leaving intact the address mapping in the OSD PCI Config logic 2015 which is particular to the other OSD's. Thus, by treating an OSD initiated reset as a reset of the local portions of the shared NIC that are particular to the requesting OSD, those local portions associated with that OSD are returned to a default state. Upon completion of the reset, the shared NIC can re-initialize itself with the requesting OSD, including remapping of the shared NIC within the memory map of the requesting OSD, while the shared NIC continues to process transactions for the other OSD's. This function is provided for by distinguishing within the shared NIC which resources are global, and which are local to particular OSD's, and by detecting which OSD is requesting reset.

Driver Initiated Reset

A driver initiated reset is similar to an OSD initiated reset, however, only the local OSD resources 2010 are reset. The OSD PCI Config logic particular to the driver requesting reset is not re-initialized. Rather, the memory map to allow the driver to continue to communicate with the shared NIC is left intact. Further, all of the global functions (the physical link, the OSD PCI Config logic particular to all OSD's, and the global resources 2012) remain intact.

Figure 22:
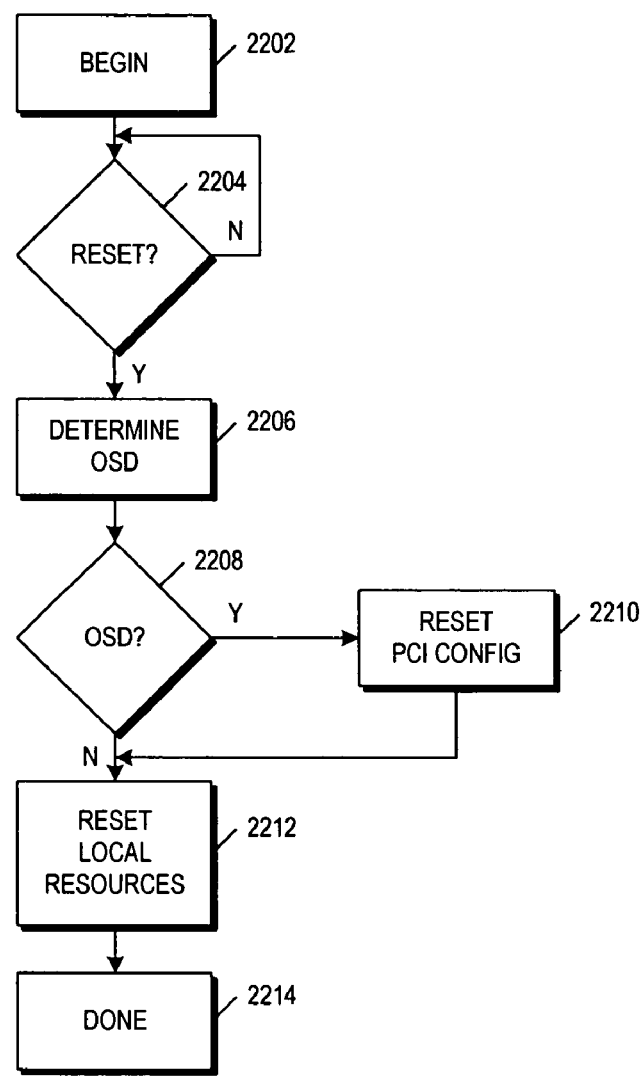
FIG. 22 is a flow chart illustrating a method of resetting local resources within the shareable controller of the present invention.

Referring to FIG. 22, a flow chart is shown which illustrates the method of the present invention for OSD and Driver initiated reset. Flow begins at block 2202 and proceeds to decision block 2204.

At decision block 2204, a determination is made as to whether a reset has occurred (either through a DLLP or CSR interaction). If not, flow proceeds back to decision block 2204 to await a reset. If a reset has is received, flow proceeds to block 2206.

At block 2206, the OSD that submitted the reset is determined. Flow then proceeds to decision block 2208.

At decision block 2208, a determination is made as to whether the reset was an OSD initiated reset, or a driver initiated reset. If it was an OSD initiated reset, flow proceeds to block 2210. Otherwise, flow proceeds to block 2212.

At block 2210, a reset of the OSD PCI Config logic, particular to the requesting OSD is reset. Flow then proceeds to block 2212.

At block 2212, a reset of the local resources associated with the requesting OSD is reset. Flow then proceeds to block 2214 where the reset is completed.

What has been described above, with respect to reset, are the novel inventions of distinguishing between "global" resets and OSD or driver specific resets within the context of a shared I/O controller of the present invention. Further what has been described is the differentiation between global and local resources within a shared I/O controller, so that only those resources particular to a requesting OSD get reset, while allowing the shared I/O controller to continue to process transactions for other OSD's. In addition, for purposes of global reset, the invention of requiring an OSD to register, or validate itself, prior to performing a global reset is taught. Several mechanisms are described which authenticate a requesting OSD as a registered master, and allow the requesting master, or the shared I/O controller, to alert the other OSD's of the impending reset. However, one skilled in the art will appreciate that many implementations may be developed for distinguishing between global and local resources for purposes of reset, and for registering a master OSD for purposes of global reset, without departing from the spirit of the invention as taught, or as embodied in the appended claims.

While not particularly shown, one skilled in the art will appreciate that many alternative embodiments may be implemented which differ from the above description, while not departing from the scope of the invention as claimed. For example, the context of the processing complexes, i.e., the environment in which they are placed has not been described because such discussion is exhaustively provided in the parent application(s). However, one skilled in the art will appreciate that the processing complexes (or operating system domains) of the present application should be read to include at least one or more processor cores within a SOC, or one or more processors within a board level system, whether the system is a desktop, server or blade. Moreover, the location of the shared I/O switch, whether placed within an SOC, on the backplane of a blade enclosure, or within a shared network interface controller should not be controlling. Rather, it is the provision of a network interface controller which can process transmits/receives for multiple processing complexes, as part of their load-store domain, to which the present invention is directed. This is true whether the OSD ID logic is within the shared network interface controller, or whether the shared network interface controller provides multiple upstream OSD aware (or non OSD aware) ports. Further, it is the tracking of outstanding transmits/receives such that the transmits/receives are accurately associated with their upstream links (or OSD's) that is important.

Additionally, the above discussion has described the present invention within the context of three processing complexes communicating with the shared network interface controller. The choice of three processing complexes was simply for purposes of illustration. The present invention could be utilized in any environment that has one or more processing complexes (servers, CPU's, etc.) that require access to a network.

Further, the present invention has utilized a shared I/O switch to associate and route packets from processing complexes to the shared network interface controller. It is within the scope of the present invention to incorporate the features of the present invention within a processing complex (or chipset) such that everything downstream of the processing complex is shared I/O aware (e.g., PCI Express+). If this were the case, the shared network interface controller could be coupled directly to ports on a processing complex, as long as the ports on the processing complex provided shared I/O information to the shared network interface controller, such as OS Domain information. What is important is that the shared network interface controller be able to recognize and associate packets with origin or upstream OS Domains, whether or not a shared I/O switch is placed external to the processing complexes, or resides within the processing complexes themselves.

And, if the shared I/O switch were incorporated within the processing complex, it is also possible to incorporate one or more shared network interface controllers into the processing complex. This would allow a single processing complex to support multiple upstream OS Domains while packaging everything necessary to talk to fabrics outside of the load/store domain (Ethernet, Fiber Channel, SATA, etc.) within the processing complex. Further, if the upstream OS Domains were made shared I/O aware, it is also possible to couple the domains directly to the network interface controllers, all within the processing complex.

And, it is envisioned that multiple shared I/O switches according to the present invention be cascaded to allow many variations of interconnecting processing complexes with downstream I/O devices such as the shared network interface controller. In such a cascaded scenario, an OS Header may be global, or it might be local. That is, it is possible that a local ID be placed within an OS Header, the local ID particularly identifying a packet, within a given link (e.g., between a processing complex and a switch, between a switch and a switch, and/or between a switch and an endpoint). So, a local ID may exist between a downstream shared I/O switch and an endpoint, while a different local ID may be used between an upstream shared I/O switch and the downstream shared I/O switch, and yet another local ID between an upstream shared I/O switch and a root complex. In this scenario, each of the switches would be responsible for mapping packets from one port to another, and rebuilding packets to appropriately identify the packets with their associating upstream/downstream port.

It is also envisioned that the addition of an OSD header within a load-store fabric, as described above, could be further encapsulated within another load-store fabric yet to be developed, or could be further encapsulated, tunneled, or embedded within a channel-based fabric such as Advanced Switching (AS) or Ethernet. AS is a multi-point, peer-to-peer switched interconnect architecture that is governed by a core AS specification along with a series of companion specifications that define protocol encapsulations that are to be tunneled through AS fabrics. These specifications are controlled by the Advanced Switching Interface Special Interest Group (ASI-SIG), 5440 SW Westgate Drive, Suite 217, Portland, Oreg. 97221 (Phone: 503-291-2566). For example, within an AS embodiment, the present invention contemplates employing an existing AS header that specifically defines a packet path through a I/O switch according to the present invention. Regardless of the fabric used downstream from the OS domain (or root complex), the inventors consider any utilization of the method of associating a shared I/O endpoint with an OS domain to be within the scope of their invention, as long as the shared I/O endpoint is considered to be within the load-store fabric of the OS domain.

Further, the above discussion has been directed at an embodiment of the present invention within the context of the Ethernet network protocol. This was chosen to illustrate the novelty of the present invention with respect to providing a shareable controller for access to a network. One skilled in the art should appreciate that other network protocols such as Infiniband, OC48/OC192, ATM, SONET, 802.11 are encompassed within the above discussion to allow for sharing controllers for such protocols among multiple processing complexes. Further, Ethernet should be understood as including the general class of IEEE Ethernet protocols, including various wired and wireless media. It is not the specific protocol to which this invention is directed. Rather, it is the sharing of a controller by multiple processing complexes which is of interest. Further, although the term MAC address should be appreciated by one skilled in the art, it should be understood as an address which is used by the Media Access Control sublayer of the Data-Link Layer (DLC) of telecommunication protocols. There is a different MAC sublayer for each physical device type. The other sublayer level in the DLC layer is the Logical Link Control sublayer.

Although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A shareable network interface controller (NIC) for a computing device having a plurality of operating system domains (OSDs), each OSD having a logically distinct load-store domain, the shareable network interface controller comprising:
 a bus interface for coupling the shareable NIC to each of the plurality of OSDs within said computing device, the bus interface enabling each OSD to directly access the NIC from within its own logically distinct load-store domain using load-store instructions;
 a plurality of local resources including distinct local resources for use by each of the OSDs, wherein particular local resources of the plurality of local resources which are associated with a given OSD of the plurality of OSDs are configurable by only the given OSD;
 one or more global resources for use in processing transactions of all of said plurality of OSDs, wherein a configuration of said one or more global resources affects processing of transactions for all of said OSDs;
 registration logic, coupled to said bus interface, for registering one of the plurality of OSDs as a master of the shareable network interface controller, wherein the master is an only one of the plurality of OSDs allowed to configure the one or more global resources; and
 logic configured to couple said controller to a network;
 wherein data conveyed from each of said plurality of OSDs is conveyed from each of said plurality of OSDs via said bus interface to a network.

2. The shareable network interface controller as recited in claim 1 wherein the bus interface couples the shareable network interface controller to each of the plurality of operating system domains via a load-store link.

3. The shareable network interface controller as recited in claim 2 wherein said load-store link comprises PCI-Express.

4. The shareable network interface controller as recited in claim 3 wherein OSD information indicating one of the plurality of operating system domains is embedded in packets on said PCI-Express.

5. The shareable network interface controller as recited in claim 4 wherein said OSD information is embedded in said packets utilizing reserved bits within said PCI-Express.

6. The shareable network interface controller as recited in claim 4 wherein said OSD information is embedded in said packets utilizing undefined bits within said PCI-Express.

7. The shareable network interface controller as recited in claim 4 wherein said OSD information is embedded in said packets utilizing functional unit bits within said PCI-Express.

8. The shareable network interface controller as recited in claim 4 wherein said OSD information is embedded in said packets utilizing an additional OSD header embedded within said PCI-Express.

9. The shareable network interface controller as recited in claim 4 wherein said OSD information is embedded in said packets utilizing address bits within said PCI-Express.

10. The shareable network interface controller as recited in claim 2 wherein said load-store link passes loads and stores to the shareable network interface controller, along with OSD information indicating an originating one of the plurality of operating system domains for said loads and stores.

11. The shareable network interface controller as recited in claim 10 wherein said OSD information is embedded within packets transferred on said load-store link.

12. The shareable network interface controller as recited in claim 1 further comprising: status/messaging logic, coupled to said registration logic, for informing other ones of the plurality of operating system domains when said one of the plurality of operating system domains becomes registered as a master.

13. The shareable network interface controller as recited in claim 12 wherein said master provides a status update to said status/messaging logic during performance of a management function.

14. The shareable network interface controller as recited in claim 13 wherein said status update establishes progress of the master in performance of said management function.

15. The shareable network interface controller as recited in claim 14 wherein said status update is readable by other ones of the plurality of operating system domains.

16. The shareable network interface controller as recited in claim 12 wherein said status/messaging logic comprises a plurality of control status registers.

17. The shareable network interface controller as recited in claim 16 wherein a first one of said plurality of control status registers is readable by a first one of the plurality of operating system domains, and a second one of said plurality of control status registers is readable by a second one of the plurality of operating system domains.

18. The shareable network interface controller as recited in claim 1 wherein each of the plurality of operating system domains comprises a processing complex executing at least one operating system.

19. The shareable network interface controller as recited in claim 18 wherein each processing complex comprises at least one microprocessor coupled to a memory.

20. The shareable network interface controller as recited in claim 19 wherein the shareable network interface controller is mapped within a region of each of said memories.

21. The shareable network interface controller as recited in claim 1 further comprising: timer logic, coupled to said registration logic, for providing a timeout signal if said master does not complete a management function within an expected completion time.

22. The shareable network interface controller as recited in claim 21 wherein said timeout signal is provided to said registration logic.

23. The shareable network interface controller as recited in claim 22 wherein upon receipt of said timeout signal by said registration logic, said registration logic un-registers said master, as master.

24. The shareable network interface controller as recited in claim 1 wherein the shareable network interface controller comprises an Ethernet controller for supporting the plurality of operating system domains.

25. The shareable network interface controller as recited in claim 24 wherein the Ethernet controller further comprises: a first port for coupling the controller to an Ethernet fabric at a first connection speed; and a second port for coupling the controller to an Ethernet fabric at a second connection speed.

26. The shareable network interface controller as recited in claim 1 further comprising: OSD PCI Config logic, coupled to said bus interface, which is only reset-able by said master.

27. The shareable network interface controller as recited in claim 26 wherein said OSD PCI Config logic comprises a plurality of entries which map each one of the plurality of operating system domains to the shareable network interface controller.

28. The shareable network interface controller as recited in claim 1 wherein said bus interface couples the shareable network interface controller to each of the plurality of operating system domains via a packet based serial link which is within the load-store domain of each of the plurality of operating system domains.

29. The shareable network interface controller as recited in claim 1 wherein said registration logic comprises a control status register.

30. The shareable network interface controller as recited in claim 1 wherein said registration logic comprises logic for confirming whether a key has been correctly provided by the one of the plurality of operating system domains.

31. The shareable network interface controller as recited in claim 1 wherein said registration logic comprises means for assuring that only one of the plurality of operating system domains is registered as a master at any one time.

32. The shareable network interface controller as recited in claim 1 wherein said one of the plurality of operating system domains which is registered as a master is allowed to globally reset the shareable network interface controller.

33. The shareable network interface controller as recited in claim 1 wherein said one of the plurality of operating system domains which is registered as a master is allowed to reload firmware within the shareable network interface controller.

34. The shareable network interface controller as recited in claim 1 wherein said one of the plurality of operating system domains which is registered as a master is allowed to change the physical link speed of a port attached to network fabric for the shareable network interface controller.

35. The shareable network interface controller as recited in claim 1 wherein said one of the plurality of operating system domains which is registered as a master is allowed to reparation global resources within the shareable network interface controller.

36. The shareable network interface controller as recited in claim 1 wherein said one of the plurality of operating system domains which is registered as a master is allowed to reset global resources within the shareable network interface controller.

37. The shareable network interface controller as recited in claim 1 further comprising global resources which are only reset-able by said master.

38. The shareable network interface controller as recited in claim 1 wherein the distinct local resources of each of said plurality of local resources are reset-able by their corresponding OSD.

39. The shareable network interface controller as recited in claim 26 wherein said OSD PCI Config logic is not reset by said master when it performs a management function on the shareable network interface controller.

40. A network interface controller (NIC) which is shareable by a plurality of operating system domains (OSDs) within a computing device, each OSD having a logically distinct load-store domain, by utilizing load-store instructions, the controller comprising:

a bus interface, for coupling the NIC to each of the plurality of OSDs within said computing device, the bus interface enabling each OSD to directly access the NIC from within its own logically distinct load-store domain using load-store instructions;

a plurality of local resources, each of said plurality of local resources associated with a different one of the plurality of OSDs;

one or more global resources, wherein each of the one or more global resources is utilized for processing said load-store instructions for each of the plurality of OSDs;

registration logic, coupled to said bus interface, for registering one of the plurality of OSDs as a master of the shareable network interface controller, wherein the master is an only one of the plurality of OSDs allowed to configure the one or more global resources;

a reset from one of the plurality of OSDs which causes a reset of its associated local resource; and logic configured to couple said controller to a network;

wherein data conveyed from each of said plurality of OSDs is conveyed from each of said plurality of OSDs via said bus interface to a network; and wherein said reset does not cause other ones of the plurality of local resources to be reset.

41. The network interface controller as recited in claim 40 wherein each of said plurality of local resources comprise: control registers for allowing their associated one of the plurality of operating system domains to communicate with the controller.

42. The network interface controller as recited in claim 41 wherein said plurality of local resources further comprises: direct memory access controllers for performing data transfer from its associated one of the plurality of operating system domains and the controller.

43. The network interface controller as recited in claim 41 further comprising a task file for storing tasks to be performed by the controller for said associated one of the plurality of operating system domains.

44. The network interface controller as recited in claim 40 wherein said registration logic comprises logic for insuring that a requesting one of the plurality of operating system domains writes a predefined key into said registration logic which authorizes it to become said master.

45. The network interface controller as recited in claim 44 wherein if said requesting one of the plurality of operating system domains does not write said predefined key into said registration logic, it cannot become said master.

46. The network interface controller as recited in claim 40 wherein said global resources cannot be configured by said reset from one of the plurality of operating system domains.

47. The network interface controller as recited in claim 40 wherein said global resources cannot be reset by said reset from one of the plurality of operating system domains.

48. The network interface controller as recited in claim 40 wherein said registration logic comprises a control register which only allows one of the plurality of operating system domains to be registered as said master, at one time.

49. The network interface controller as recited in claim 40 wherein said configuring of said global resources comprises: reloading of firmware into the controller.

50. The network interface controller as recited in claim 40 wherein said configuring of said global resources comprises repartitioning of memory utilized by each of the plurality of operating system domains.

51. The network interface controller as recited in claim 40 further comprising: timer logic, for providing a timeout if said master does not complete configuration of said global resources within a predetermined time; and status/messaging logic, for allowing said master to update the status of configuration of said global resources to other ones of the plurality of operating system domains.

* * * * *